United States Patent
Gu et al.

(10) Patent No.: US 8,485,789 B2
(45) Date of Patent: Jul. 16, 2013

(54) CAPACITY MODULATED SCROLL COMPRESSOR SYSTEM AND METHOD

(75) Inventors: Yumin Gu, Suzhou (CN); Xilai Yang, Suzhou (CN); Simon Wang, Hong Kong (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 1178 days.

(21) Appl. No.: 12/121,856

(22) Filed: May 16, 2008

(65) Prior Publication Data

US 2008/0286118 A1 Nov. 20, 2008

Related U.S. Application Data

(60) Provisional application No. 60/931,022, filed on May 18, 2007.

(51) Int. Cl.
*F04B 49/00* (2006.01)

(52) U.S. Cl.
USPC .............................. 417/26; 417/213; 417/454

(58) Field of Classification Search
USPC .......... 417/26, 44.1, 212, 213, 454; 62/228.1, 62/228.4, 228.5, 158
See application file for complete search history.

(56) References Cited

U.S. PATENT DOCUMENTS

| | | |
|---|---|---|
| 3,978,382 A | 8/1976 | Pfarrer et al. |
| 4,041,542 A | 8/1977 | Pfarrer et al. |
| 4,105,374 A | 8/1978 | Scharf |
| 4,205,537 A | 6/1980 | Dubberley |
| 4,252,506 A | 2/1981 | Hannibal |
| 4,277,955 A | 7/1981 | Parker |
| 4,358,254 A | 11/1982 | Hannibal |
| 4,396,360 A | 8/1983 | Elson |
| 4,515,539 A | 5/1985 | Morishita |
| 4,818,198 A | 4/1989 | Tamura et al. |
| 4,946,361 A | 8/1990 | DeBlois et al. |
| 5,002,470 A | 3/1991 | Gormley et al. |
| 5,123,818 A | 6/1992 | Gormley et al. |

(Continued)

FOREIGN PATENT DOCUMENTS

| | | |
|---|---|---|
| CN | 1219648 A | 6/1999 |
| CN | 1289011 A | 3/2001 |

(Continued)

OTHER PUBLICATIONS

International Search Report for International Application No. PCT/US2008/006397 dated Sep. 8, 2008.

(Continued)

*Primary Examiner* — Devon Kramer
*Assistant Examiner* — Joseph Herrmann
(74) *Attorney, Agent, or Firm* — Harness, Dickey & Pierce, P.L.C.

(57) ABSTRACT

A system and method for modulating capacity of a scroll compressor having a motor includes determining a target capacity of the scroll compressor, operating the motor at a first speed when the target capacity is within a first predetermined capacity range and at a second speed when the target capacity is within a second predetermined capacity range, determining a pulse width modulation cyclic ratio based on the target capacity and the first or second speed, and periodically separating intermeshing scroll members of the compressor according to the pulse width modulation cyclic ratio to modulate the capacity of the scroll compressor.

10 Claims, 19 Drawing Sheets

U.S. PATENT DOCUMENTS

| | | | |
|---|---|---|---|
| 5,211,031 A | | 5/1993 | Murayama et al. |
| 5,240,389 A | * | 8/1993 | Oikawa et al. ............... 417/310 |
| 5,328,344 A | | 7/1994 | Sato et al. |
| 5,345,785 A | | 9/1994 | Sekigami et al. |
| 5,385,453 A | | 1/1995 | Fogt et al. |
| 5,609,478 A | | 3/1997 | Utter et al. |
| 5,613,841 A | | 3/1997 | Bass et al. |
| 5,678,985 A | | 10/1997 | Brooke et al. |
| 5,741,120 A | * | 4/1998 | Bass et al. ................. 417/44.2 |
| 5,800,141 A | | 9/1998 | Ceylan et al. |
| 5,931,649 A | | 8/1999 | Caillat et al. |
| 6,027,321 A | | 2/2000 | Shim et al. |
| 6,047,557 A | | 4/2000 | Pham et al. |
| 6,053,715 A | | 4/2000 | Hirano et al. |
| 6,086,335 A | * | 7/2000 | Bass et al. .................... 417/220 |
| 6,106,253 A | | 8/2000 | Sakai et al. |
| 6,171,076 B1 | | 1/2001 | Gannaway |
| 6,193,473 B1 | | 2/2001 | Mruk et al. |
| 6,196,816 B1 | | 3/2001 | Lifson et al. |
| 6,206,652 B1 | * | 3/2001 | Caillat ......................... 417/298 |
| 6,213,731 B1 | | 4/2001 | Doepker et al. |
| 6,264,446 B1 | | 7/2001 | Rajendran et al. |
| 6,267,572 B1 | | 7/2001 | Suefuji et al. |
| 6,280,154 B1 | | 8/2001 | Clendenin et al. |
| 6,290,472 B2 | | 9/2001 | Gannaway |
| 6,293,776 B1 | | 9/2001 | Hahn et al. |
| 6,322,339 B1 | | 11/2001 | Mitsunaga et al. |
| 6,393,852 B2 | | 5/2002 | Pham et al. |
| 6,408,635 B1 | | 6/2002 | Pham et al. |
| 6,412,293 B1 | | 7/2002 | Pham et al. |
| 6,438,974 B1 | | 8/2002 | Pham et al. |
| 6,449,972 B2 | | 9/2002 | Pham et al. |
| 6,467,280 B2 | | 10/2002 | Pham et al. |
| 6,478,550 B2 | * | 11/2002 | Matsuba et al. ............. 417/310 |
| 6,499,305 B2 | | 12/2002 | Pham et al. |
| 6,519,958 B1 | * | 2/2003 | Moon et al. .................... 62/199 |
| 6,619,062 B1 | * | 9/2003 | Shibamoto et al. .......... 62/228.3 |
| 6,619,936 B2 | | 9/2003 | Perevozchikov |
| 6,662,578 B2 | | 12/2003 | Pham et al. |
| 6,662,583 B2 | | 12/2003 | Pham et al. |
| 6,672,846 B2 | | 1/2004 | Rajendran et al. |
| 6,679,072 B2 | | 1/2004 | Pham et al. |
| 6,821,092 B1 | * | 11/2004 | Gehret et al. ................ 417/213 |
| 6,884,042 B2 | * | 4/2005 | Zili et al. ..................... 417/310 |
| 6,929,455 B2 | | 8/2005 | Dreiman et al. |
| 6,988,876 B2 | | 1/2006 | Ke et al. |
| 7,094,043 B2 | | 8/2006 | Skinner |
| 7,201,567 B2 | | 4/2007 | Wiertz et al. |
| RE40,554 E | * | 10/2008 | Bass et al. .................... 417/220 |
| RE40,830 E | * | 7/2009 | Caillat ......................... 417/298 |
| 7,721,562 B2 | | 5/2010 | Lifson et al. |
| 2001/0002239 A1 | | 5/2001 | Pham et al. |
| 2001/0045097 A1 | | 11/2001 | Pham et al. |
| 2001/0049942 A1 | | 12/2001 | Pham et al. |
| 2002/0178737 A1 | | 12/2002 | Pham et al. |
| 2003/0033823 A1 | * | 2/2003 | Pham et al. .................. 62/228.3 |
| 2003/0084672 A1 | | 5/2003 | Pham et al. |
| 2003/0089119 A1 | | 5/2003 | Pham et al. |
| 2003/0094004 A1 | | 5/2003 | Pham et al. |
| 2004/0123612 A1 | | 7/2004 | Pham et al. |
| 2004/0265140 A1 | | 12/2004 | Sun et al. |
| 2005/0244277 A1 | | 11/2005 | Hurst et al. |
| 2006/0280627 A1 | * | 12/2006 | Jayanth ...................... 417/410.5 |
| 2006/0288715 A1 | | 12/2006 | Pham et al. |
| 2007/0022771 A1 | | 2/2007 | Pham et al. |
| 2007/0130973 A1 | * | 6/2007 | Lifson et al. ................ 62/196.3 |
| 2008/0196445 A1 | * | 8/2008 | Lifson et al. .................... 62/498 |
| 2008/0223057 A1 | * | 9/2008 | Lifson et al. ................. 62/228.4 |
| 2008/0250812 A1 | | 10/2008 | Lifson et al. |
| 2008/0314057 A1 | * | 12/2008 | Lifson et al. ................. 62/228.4 |

FOREIGN PATENT DOCUMENTS

| | | |
|---|---|---|
| EP | 0747597 A2 | 12/1996 |
| EP | 0980978 | 2/2000 |
| EP | 1087142 | 3/2001 |
| GB | 2246451 A | 1/1992 |
| JP | 56165701 A | 12/1981 |
| JP | 573869 | 3/1982 |
| JP | 60053601 A | 3/1985 |
| JP | 0294987 | 11/1989 |
| JP | 0201882 | 1/1990 |
| JP | 02140477 A | 5/1990 |
| JP | 04031689 A | 2/1992 |
| JP | 04121474 A | 4/1992 |
| JP | 404121478 | 4/1992 |
| JP | 404203489 | 7/1992 |
| JP | 05099164 A | 4/1993 |
| JP | 406002670 | 1/1994 |
| JP | 07091385 A | 4/1995 |
| JP | 8200247 A | 8/1996 |
| JP | 10037866 A | 2/1998 |
| JP | 11141483 A | 5/1999 |
| JP | 2001099078 A | 4/2001 |
| JP | 2001518601 | 10/2001 |
| KR | 20050088765 | 9/2005 |
| WO | WO-9917066 A1 | 4/1999 |
| WO | 2006132638 A1 | 12/2006 |
| WO | 2007050063 A1 | 5/2007 |

OTHER PUBLICATIONS

Written Opinion of the International Searching Authority for International Application No. PCT/US2008/006397 dated Sep. 8, 2008.

Notification of First Office Action dated Sep. 14, 2007 regarding Application No. 2006100940084, CCPIT Patent and Trademark Office provided the English translation.

Notification of the Second Office Action dated Aug. 7, 2009 regarding Application No. 200610094008.4. CCPIT Patent and Trademark Law Office provided the English translation.

European Search Report for App. No. EP 02 25 0369, dated Apr. 9, 2003.

European Search Report for App. No. EP 04 01 4814, dated Feb. 2, 2006.

European Search Report for App. No. EP 04 02 3763, dated Mar. 20, 2008.

European Search Report for App. No. EP 04 02 3764, dated Apr. 17, 2008.

European Search Report for App. No. EP 04 02 3765, dated Apr. 17, 2008.

Notice of Reasons for Rejection regarding Japanese Patent Application No. 2001-295,714, dated Mar. 29, 2011. English translation provided by Kanzaki Patent Office.

Notification of the First Office Action from the State Intellectual Property Office of Peole's Republic of China regarding Chinese Patent Application No. 200880024994.3, dated Jul. 24, 2012. Translation provided by Unitalen Attorneys at Law.

Seond Office Action from the State Intellectual Property Office of People's Republic of China regarding Chinese Patent Application No. 200880024994.3, dated Apr. 15, 2013. Translation provided by Unitalen Attorneys at Law.

* cited by examiner

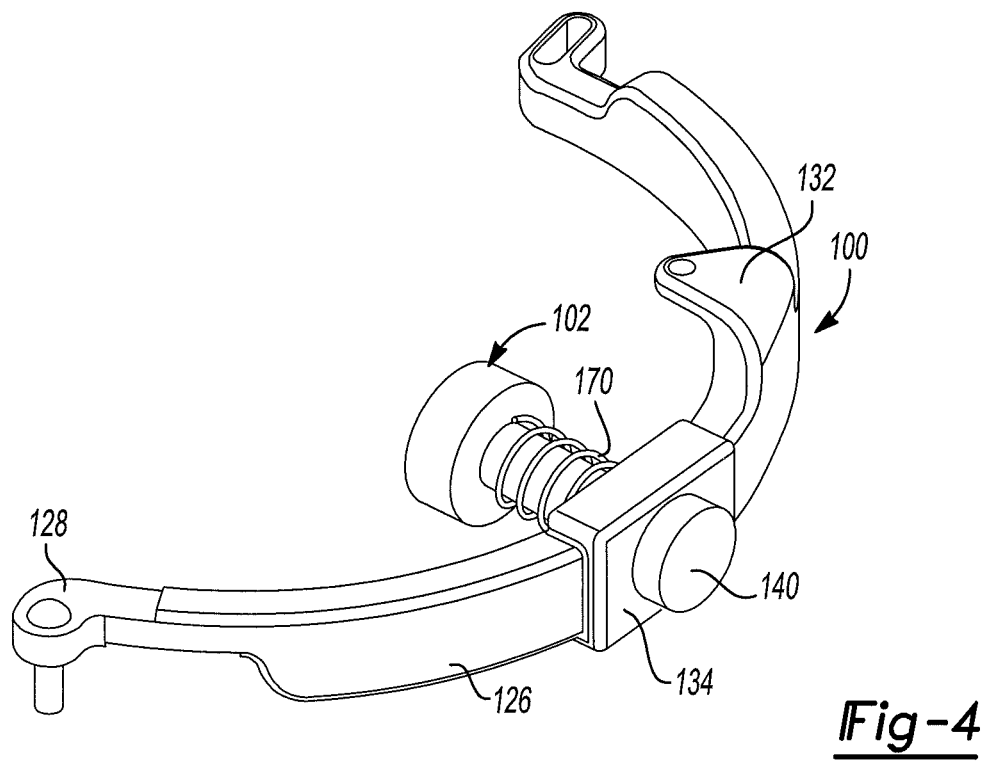
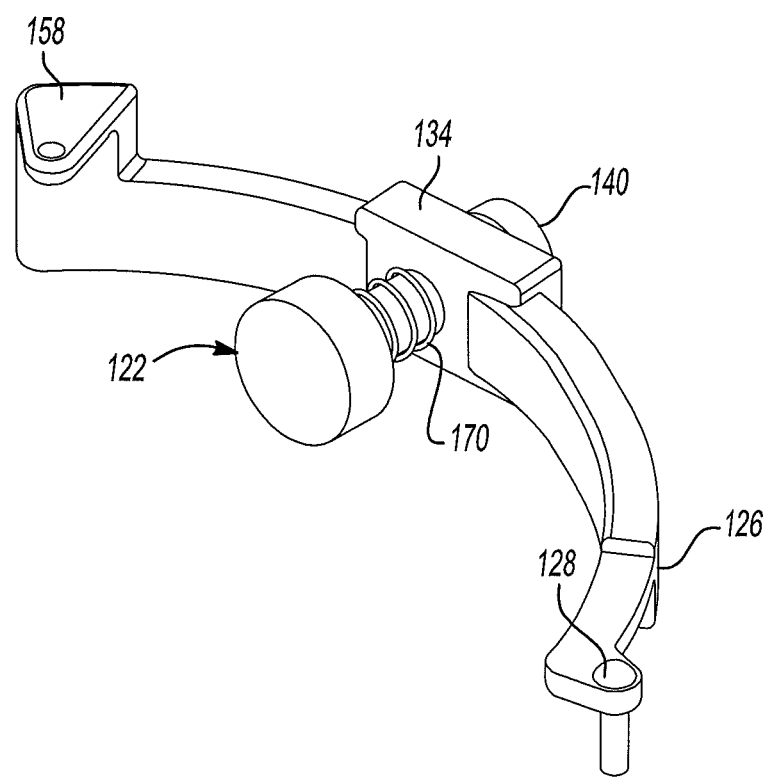
Fig-4

CAPACITY MODULATED SCROLL COMPRESSOR SYSTEM AND METHOD

CROSS-REFERENCE TO RELATED APPLICATIONS

This application claims the benefit of U.S. Provisional Application No. 60/931,022, filed on May 18, 2007. The disclosures of the above application is incorporated herein by reference.

FIELD

The present disclosure relates to compressors and, more particularly, to a capacity modulation system and method for a scroll compressor.

BACKGROUND

The statements in this section merely provide background information related to the present disclosure and may not constitute prior art.

Scroll compressors may be used in a wide variety of industrial and residential applications to circulate refrigerant within a refrigeration, heat pump, HVAC, or chiller system (generically "refrigeration systems") to provide a desired heating or cooling effect. A scroll compressor may incorporate a pair of intermeshed spiral wraps, or scroll members, one of which orbits with respect to the other so as to define one or more moving chambers which progressively decrease in size as they travel from an outer suction port towards a center discharge port. An electric motor may drive the orbiting scroll member.

Compressor capacity may be modulated according to refrigeration system load to increase compressor efficiency. For example, capacity modulation may be accomplished by a scroll separation system that separates the two scroll members to create a leak path and unload the compressor for predetermined periods of time. The leak path may be created by axial or radial separation of the scroll members. A scroll compressor with a scroll separation system that unloads the compressor by separating the scroll members is described in U.S. Pat. No. 6,213,731, the disclosure of which is incorporated herein by reference.

Capacity modulation may also be accomplished by a delayed suction system that utilizes ports provided at one or more positions which, when opened with valves, allow the initially formed compression chamber between the scroll members to communicate with the suction chamber of the compressor. Opening the ports creates a leak path between the initially formed compression chamber and the suction chamber to unload the compressor. This delays the point at which the sealed compression chambers are formed and, thus, delays the start of compression. A scroll compressor with a delayed suction system that modulates compressor capacity by venting an intermediate pressurized chamber to the suction chamber is described in U.S. Pat. No. 6,821,092, the disclosure of which is incorporated herein by reference.

Capacity modulation may also be accomplished by a refrigerant injection system that injects refrigerant at a higher pressure than the suction pressure into the suction chamber or into one or more intermediate pressurized moving chambers between the scroll members. Compressor capacity may be increased, as compared with normal compressor capacity, by injecting the higher pressure refrigerant. A scroll compressor with a refrigerant injection system is described in U.S. Pat. No. 6,619,936, the disclosure of which is incorporated herein by reference.

Traditional capacity modulation systems, however, may result in inefficient energy usage or consumption. For example, when compressor capacity is decreased with a capacity modulation system, the compressor may continue to consume power while operating during the time the compressor is unloaded. The unloaded compressor may continue to consume power although the unloaded compressor is not compressing or circulating refrigerant.

SUMMARY

A method is described including determining a target capacity of a scroll compressor having a motor, operating the motor at a first speed when the target capacity is within a first predetermined capacity range and at a second speed when the target capacity is within a second predetermined capacity range. The method also includes determining a pulse width modulation cyclic ratio based on the target capacity and the first or second speed and periodically separating intermeshing scroll members of the compressor according to the pulse width modulation cyclic ratio to modulate a capacity of the scroll compressor.

In other features, the method is described wherein the second speed is half of the first speed.

In other features, the method is described wherein the first predetermined capacity range is from about fifty percent capacity to about one hundred percent capacity and wherein the second predetermined capacity range is from about five percent capacity to about fifty percent capacity.

In other features, the method includes selectively opening at least one valve to release pressure from at least one intermediate chamber within the intermeshing scroll members of the scroll compressor and to modulate the capacity of said scroll compressor.

In other features, the method is described wherein the first predetermined capacity range and the second predetermined capacity range each include an upper capacity range and a lower capacity range and wherein the selectively opening the at least one valve includes opening the at least one valve when the target capacity is within one of the lower capacity ranges and closing the at least one valve when the target capacity is within one of the upper capacity ranges.

In other features, the method is described wherein the upper portion of the first predetermined capacity range is from about sixty seven percent to about one hundred percent, the lower portion of the first predetermined capacity range is from about fifty percent to about sixty seven percent, the upper portion of said second predetermined capacity range is from about thirty three percent to about fifty percent, and the lower portion of the second predetermined capacity range is from about five percent to about thirty four percent.

In other features, the method includes selectively injecting refrigerant at a higher pressure than a suction pressure of the scroll compressor into an intermediate chamber of the intermeshing scroll members to modulate the capacity of the scroll compressor according to the target capacity.

Another method is described including determining a target capacity of a scroll compressor having intermeshing scroll members and a motor and operating the motor at a first speed when the target capacity is within a first predetermined capacity range and at a second speed when the target capacity is within a second predetermined capacity range, the first predetermined capacity range and the second predetermined capacity range each having an upper capacity range and a lower capacity range. The method also includes determining a first pulse width modulation cyclic ratio based on the target capacity and the first or second speed and periodically opening at least one valve to release pressure from at least one intermediate chamber created by the intermeshing scroll members according to the first pulse width modulation cyclic ratio to modulate a capacity of the scroll compressor when the target capacity is within one of the upper capacity ranges. The method also includes determining a second pulse width modulation cyclic ratio based on the target capacity and the first or second speed, opening the at least one valve, and periodically separating the intermeshing scroll members according to the second pulse width modulation cyclic ratio to modulate the capacity of the scroll compressor when the target capacity is within one of the lower capacity ranges.

In other features, the method is described wherein the second speed is half of the first speed and the first predetermined capacity range is from about fifty percent capacity to about one hundred percent capacity and wherein the second predetermined capacity range is from about five percent capacity to about fifty percent capacity.

In other features, the method is described wherein the upper portion of the first predetermined capacity range is from about sixty seven percent to about one hundred percent, the lower portion of the first predetermined capacity range is from about fifty percent to about sixty seven percent, the upper portion of the second predetermined capacity range is from about thirty three percent to about fifty percent, and the lower portion of the second predetermined capacity range is from about five percent to about thirty four percent.

In other features, the method includes selectively injecting refrigerant at a higher pressure than a suction pressure of the scroll compressor into an intermediate chamber of the intermeshing scroll members to modulate capacity of the scroll compressor according to the target capacity.

A system is described that includes a scroll compressor having intermeshing scroll members and a motor, a scroll separation system that modulates a capacity of the scroll compressor by separating the intermeshing scroll members, and a controller, connected to the motor and the scroll separation system. The controller determines a target capacity of the scroll compressor, operates the motor at a first speed when the target capacity is within a first predetermined capacity range, operates the motor at a second speed when the target capacity is within a second predetermined capacity range, determines a first pulse width modulation cyclic ratio based on the target capacity and the first or second speed, and operates the scroll separation system according to the first pulse width modulation cyclic ratio to modulate the capacity of the scroll compressor.

In other features, the system is described wherein the second speed is half of the first speed and the first predetermined capacity range is from about fifty percent capacity to about one hundred percent capacity and wherein the second predetermined capacity range is from about five percent capacity to about fifty percent capacity.

In other features, the system is described wherein the first predetermined capacity range and the second predetermined capacity range each include an upper capacity range and a lower capacity range and the system further includes a delayed suction system connected to the controller that modulates the capacity of the scroll compressor by selectively opening at least one valve to release pressure from at least one intermediate chamber within the intermeshing scroll members of the scroll compressor. The controller operates the delayed suction system by opening the at least one valve when the target capacity is within one of the lower capacity ranges and closing the at least one valve when the target capacity is within one of the upper capacity ranges.

In other features, the system is described wherein the first predetermined capacity range and the second predetermined capacity range each include an upper capacity range and a lower capacity range and the system further includes a delayed suction system connected to the controller that modulates the capacity of the scroll compressor by selectively opening at least one valve to release pressure from at least one intermediate chamber within the intermeshing scroll members of the scroll compressor. When the target capacity is within one of said lower capacity ranges, the controller opens the at least one valve and operates the scroll separation system according to the first pulse width modulation cyclic ratio. When the target capacity is within one of the upper capacity ranges, the controller determines a second pulse width modulation cyclic ratio based on the target capacity and the first or second speed and periodically opens the at least one valve according to the second pulse width modulation cyclic ratio.

In other features, the system is described wherein the upper portion of the first predetermined capacity range is from about sixty seven percent to about one hundred percent, the lower portion of the first predetermined capacity range is from about fifty percent to about sixty seven percent, the upper portion of the second predetermined capacity range is from about thirty three percent to about fifty percent, and the lower portion of the second predetermined capacity range is from about five percent to about thirty four percent.

In other features, the system further includes a refrigerant injection system connected to the controller that modulates the capacity of the scroll compressor by selectively injecting refrigerant at a higher pressure than a suction pressure of the scroll compressor into an intermediate chamber of the intermeshing scroll members. The controller operates the refrigerant injection system according to the target capacity.

In other features, the system is described wherein the refrigerant injection system includes at least one of a flexible tube that connects an injection fitting of a shell of the scroll compressor with the intermediate chamber and a slidable connector that allows a connection between the injection fitting of the shell with the intermediate chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a perspective view of an annular valve ring;

DETAILED DESCRIPTION

Figure 1:
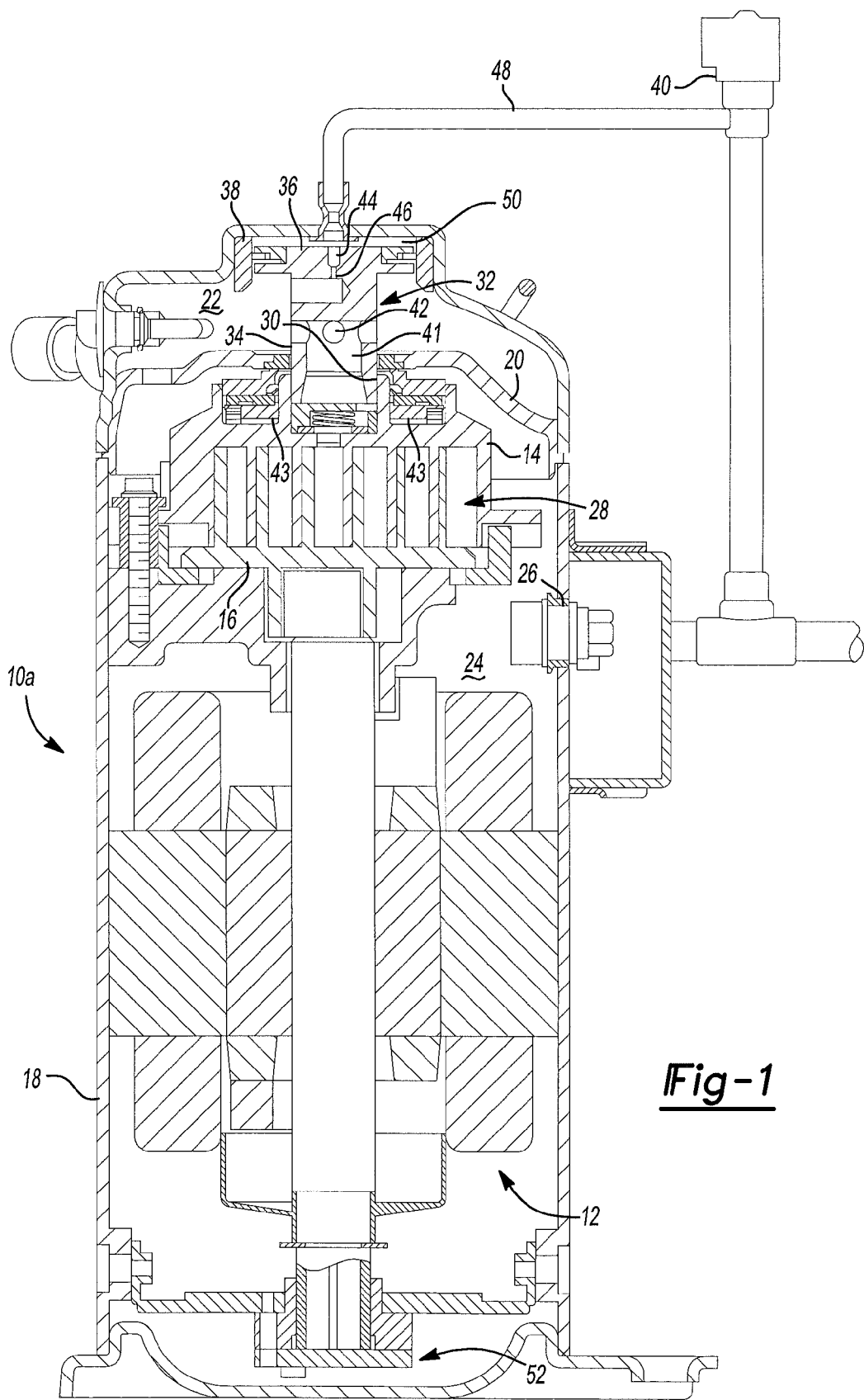
FIG. 1 is a section view of a scroll compressor with a scroll separation system.

The following description is merely exemplary in nature and is not intended to limit the present disclosure, application, or uses. It should be understood that throughout the drawings, corresponding reference numerals indicate like or corresponding parts and features.

As used herein, the terms module, control module, and controller refer to one or more of the following: an application specific integrated circuit (ASIC), an electronic circuit, a processor (shared, dedicated, or group) and memory that execute one or more software or firmware programs, a combinational logic circuit, or other suitable components that provide the described functionality. As used herein, computer-readable medium refers to any medium capable of storing data for a computer. Computer-readable medium may include, but is not limited to, memory, RAM, ROM, PROM, EPROM, EEPROM, flash memory, punch cards, dip switches, CD-ROM, floppy disk, magnetic tape, other magnetic medium, optical medium, or any other device or medium capable of storing data for a computer.

Figure 2:
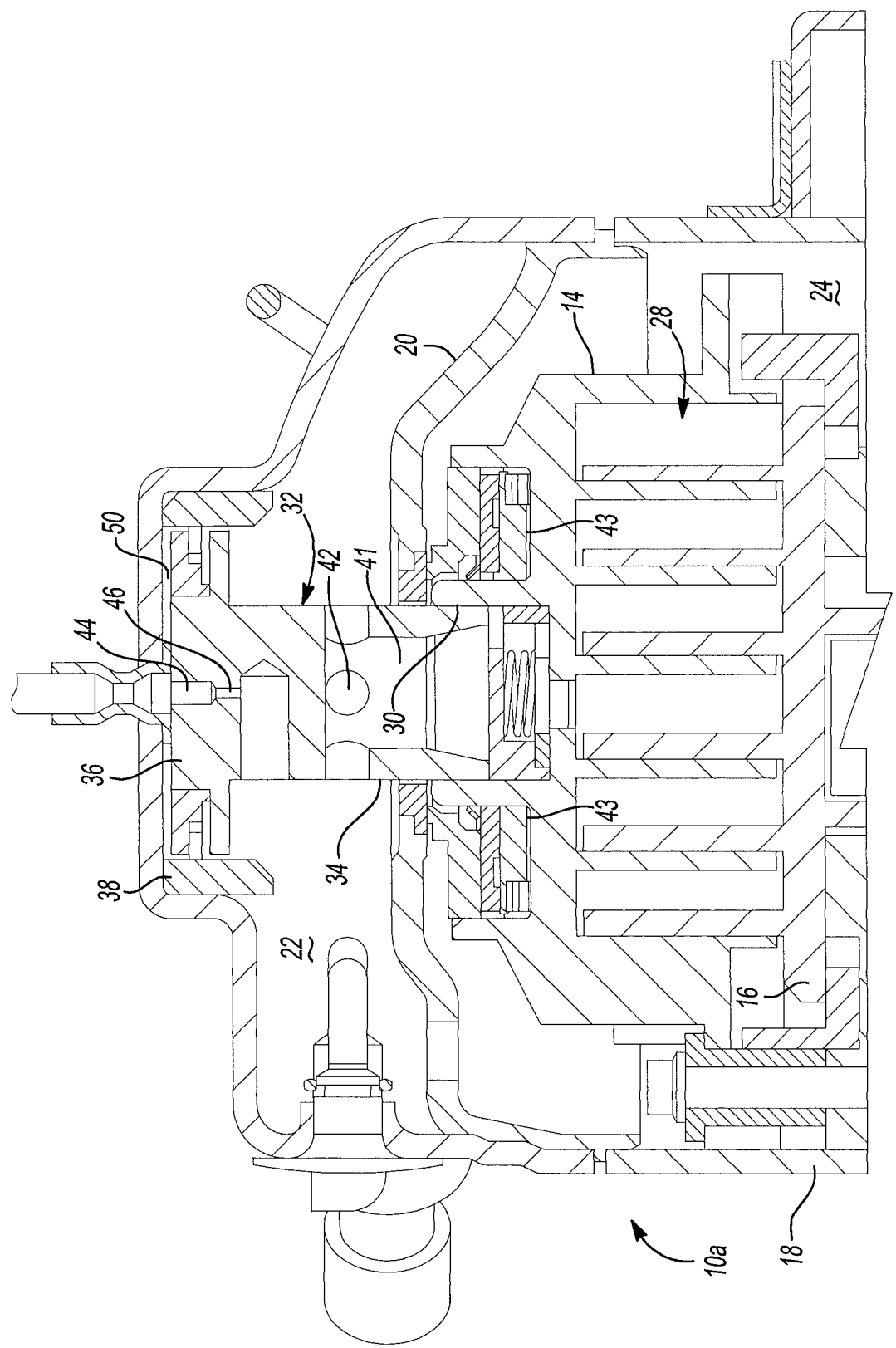
FIG. 2 is a section view of a scroll compressor with a scroll separation system.

With reference to FIGS. 1 and 2, a scroll compressor 10a may have a variable speed electric motor 12 and a capacity modulation system, including a scroll separation system 32 for selectively separating scroll members 14, 16. Variable speed electric motor 12 may have two or more speeds. Alternatively, an electric motor with a variable frequency drive may be used. Compressor capacity may be modulated by controlling electric motor speed and/or by periodically separating scroll members 14, 16.

Electric motor 12 may be a two-pole/four-pole motor which operates at a high speed, such as 3,600 rpm at 60 Hz, in the 2-pole configuration and at a low speed, such as 1,800 rpm at 60 Hz in the 4-pole configuration. Such an electric motor is described in U.S. Pat. No. 6,175,209, the disclosure of which is incorporated herein by reference. Electric motor 12 may be powered by a single-phase or three-phase alternating current power supply. Electric motor 12 may be controlled by a motor control circuit configured to selectively drive electric motor 12 at high or low speed, such as the control circuit for a two-speed motor described in U.S. Pat. No. 5,689,168, the disclosure of which is incorporated herein by reference.

Scroll compressor 10a may include an orbiting scroll member 16 drivingly connected to a crankshaft driven by electric motor 12. A non-orbiting scroll member 14 may be positioned in meshing engagement with orbiting scroll member 16. A shell 18 of scroll compressor 10a may define an interior of scroll compressor 10a. A partition plate 20 may be provided adjacent the upper end of shell 18 to divide the interior into a discharge chamber 22 at an upper end and a suction chamber 24 at a lower end. As orbiting scroll member 16 orbits with respect to non-orbiting scroll member 14, refrigerant may be drawn into suction chamber 24 of shell 18 via a suction fitting 26. From suction chamber 24, refrigerant may be sucked into a suction port 28 provided in non-orbiting scroll member 14. Intermeshing scroll members 14, 16 may define moving pockets which progressively decrease in size as they move radially inward as a result of the orbiting motion of orbiting scroll member 16 thus compressing refrigerant entering via suction port 28. Compressed refrigerant may be discharged into discharge chamber 22 via a discharge port 30 provided in non-orbiting scroll member 14. A pressure responsive discharge valve may be provided seated within discharge port 30.

A scroll separation system 32 may include a piston 36 and a solenoid valve 40. Piston 36 may form a seal with a sleeve 38 within an upper end of discharge chamber 22. Piston 36, sleeve 38, and shell 18 may form a chamber 50. A lower end of piston 36 may include a port fitting 34 that may be threadingly received or otherwise secured within discharge port 30. Piston 36 may include an internal cavity 41 and a plurality of discharge passages 42. Pressurized refrigerant may overcome the biasing load of the discharge valve to open the discharge valve and allow pressurized refrigerant to flow through internal cavity 41, through discharge passages 42, and into discharge chamber 22.

Piston 36 may define a passageway 44 and orifice 46 which may extend through piston 36 to communicatively connect discharge chamber 22 with chamber 50. Chamber 50 may be communicatively connected to solenoid valve 40 by a tube 48.

To load scroll compressor 10a and bias non-orbiting scroll member 14 into sealing engagement with orbiting scroll member 16, solenoid valve 40 may block communication between chamber 50 and suction chamber 24. In this position, chamber 50 is in communication with discharge chamber 22 and pressurized refrigerant at discharge pressure may fill chamber 50. In this position, intermediate pressure within intermediate cavity 43 (also shown in FIG. 3) may act against non-orbiting scroll member 14 to bias non-orbiting scroll member 14 towards orbiting scroll member 16 to seal and engage the axial ends of each scroll member 14, 16. In FIG. 1, solenoid valve 40 is shown blocking communication between chamber 50 and suction chamber 24 and non-orbiting scroll member 14 is shown biased into sealing engagement with orbiting scroll member 16.

To unload scroll compressor 10a and separate scroll members 14, 16, solenoid valve 40 may allow direct communication between chamber 50 and suction chamber 24 such that pressure in chamber 50 is released to suction chamber 24. With pressure in chamber 50 released to suction chamber 24, the pressure difference on opposite sides of piston 36 will move non-orbiting scroll member 14 upward to separate the axial end of the tips of each scroll member 14, 16 and higher pressurized pockets will bleed to lower pressurized pockets and eventually to suction chamber 24. By creating a leak path by separation of scroll members 14, 16, scroll compressor 10a may be unloaded. Orifice 46 may control the flow of discharge gas between discharge chamber 22 and chamber 50. When unloading occurs, the discharge valve may move to its closed position thereby preventing backflow of high pressurized refrigerant from discharge chamber 22. In FIG. 2, solenoid valve 40 is shown allowing communication between chamber 50 and suction chamber 24 and non-orbiting scroll member 14 is axially raised and separated from orbiting scroll member 16.

When compression of refrigerant is to be resumed, solenoid valve 40 may block communication between chamber 50 and suction chamber 24 to allow chamber 50 to be pressurized by discharge pressure from discharge chamber 22 through passageway 44 and orifice 46.

Figure 11:
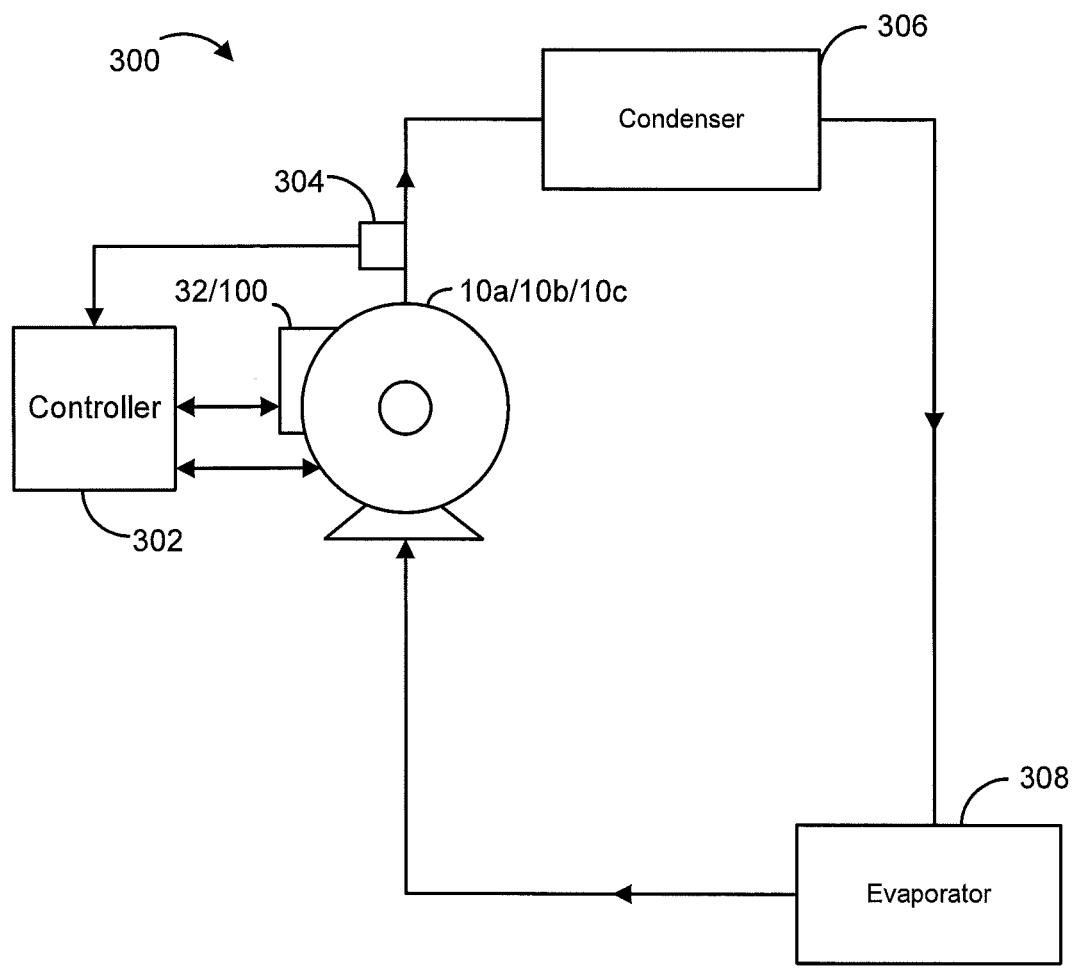
FIG. 11 is a view of a refrigeration system.

With reference to FIG. 11, scroll compressor 10a may be controlled by a controller 302 and may be part of a refrigeration system 300 including a condenser 306 and an evaporator 308. Scroll compressor 10a may compress refrigerant that is circulated to condenser 306 and evaporator 308 to cool a refrigerated space. Controller 302 may be connected to one or more refrigeration system sensors, such as a discharge temperature or pressure sensor 304. A suction temperature or pressure sensor, or other suitable refrigeration system sensor, may also be used. Sensed pressure or temperature may be indicative of refrigeration system load. Controller 302 may modulate compressor capacity to match refrigeration system load by modulating the speed of electric motor 12 and/or by periodically separating scroll members 14, 16 according to a target capacity (TC) derived from sensed refrigeration system conditions.

In FIG. 11, scroll compressor 10a is shown with a capacity modulation system, which may include scroll separation system 32 described above with reference to FIGS. 1 and 2. Solenoid valve 40 of scroll separation system 32 may be controlled by controller 302, which may operate solenoid valve 40 over an operating cycle. Controller 302 may control compressor capacity by pulse width modulation (PWM) of scroll separation system 32. Specifically, controller 302 may control PWM of solenoid valve 40 over a portion of the operating cycle. For example, controller 302 may operate scroll compressor 10a at a desired capacity percentage by activating and deactivating solenoid valve during the operating cycle. The PWM cyclic ratio of solenoid valve 40 may determine the percent capacity of operation of scroll compressor 10a.

Figure 12A:
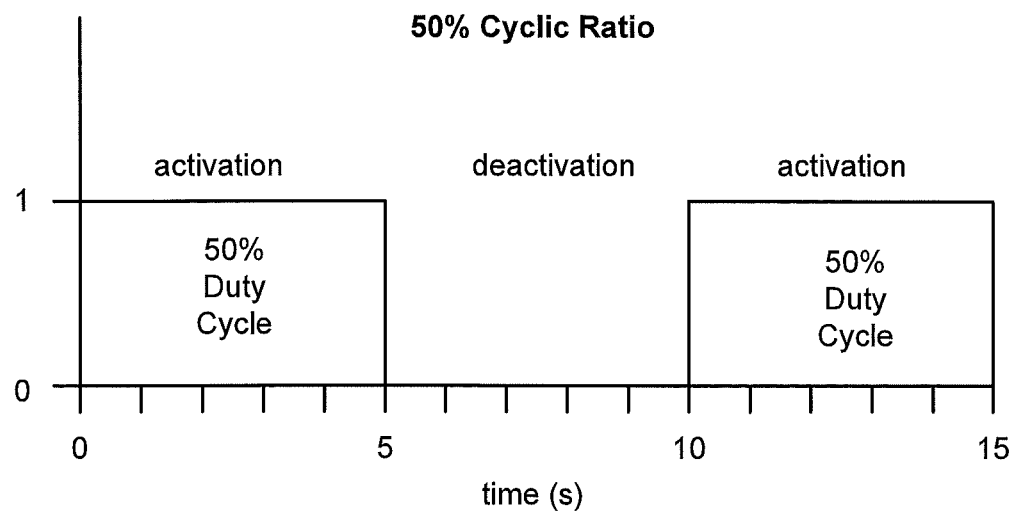
FIG. 12 is a graph of pulse width modulation cyclic ratios of activation.
Figure 12B:
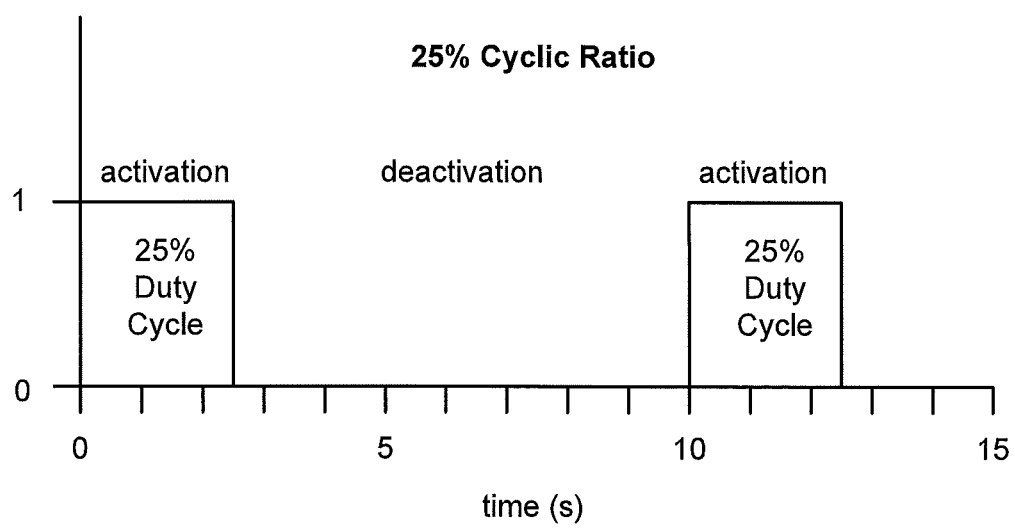

With reference to FIGS. 12(a) and 12(b), a ten second operating cycle is shown. In FIG. 12(a), a fifty percent cyclic ratio, with a fifty percent activation duty cycle, is shown with alternating five second periods of activation and deactivation. The periods of activation and deactivation may correspond to activation and deactivation of solenoid valve 40, or other components configured for pulse width modulation. The period of the operating cycle is ten seconds and the frequency of the operating cycle is 0.1 Hertz. The cyclic ratio may be calculated as the ratio of activation time to total operating cycle period. For example, in FIG. 12(b), a twenty-five percent cyclic ratio, or with a twenty-five percent activation duty cycle, is shown. A two and a half second period of activation is alternated with a seven and a half second period of compressor unloading. Other operating cycle periods may be used. For example, an operating cycle of five seconds, twenty seconds, thirty seconds, or any other suitable period may be used.

In addition to modulating compressor capacity by axial separation of scroll members 14, 16, controller 302 may also control compressor capacity by modulating electric motor speed to maximize compressor efficiency. Specifically, controller 302 may vary the PWM cyclic ratio of solenoid valve 40 while operating electric motor 12 at high speed to produce a high compressor capacity range. Controller 302 may also vary the PWM cyclic ratio of solenoid valve 40 while operating electric motor 12 at low speed to produce a low compressor capacity range.

Figure 13:
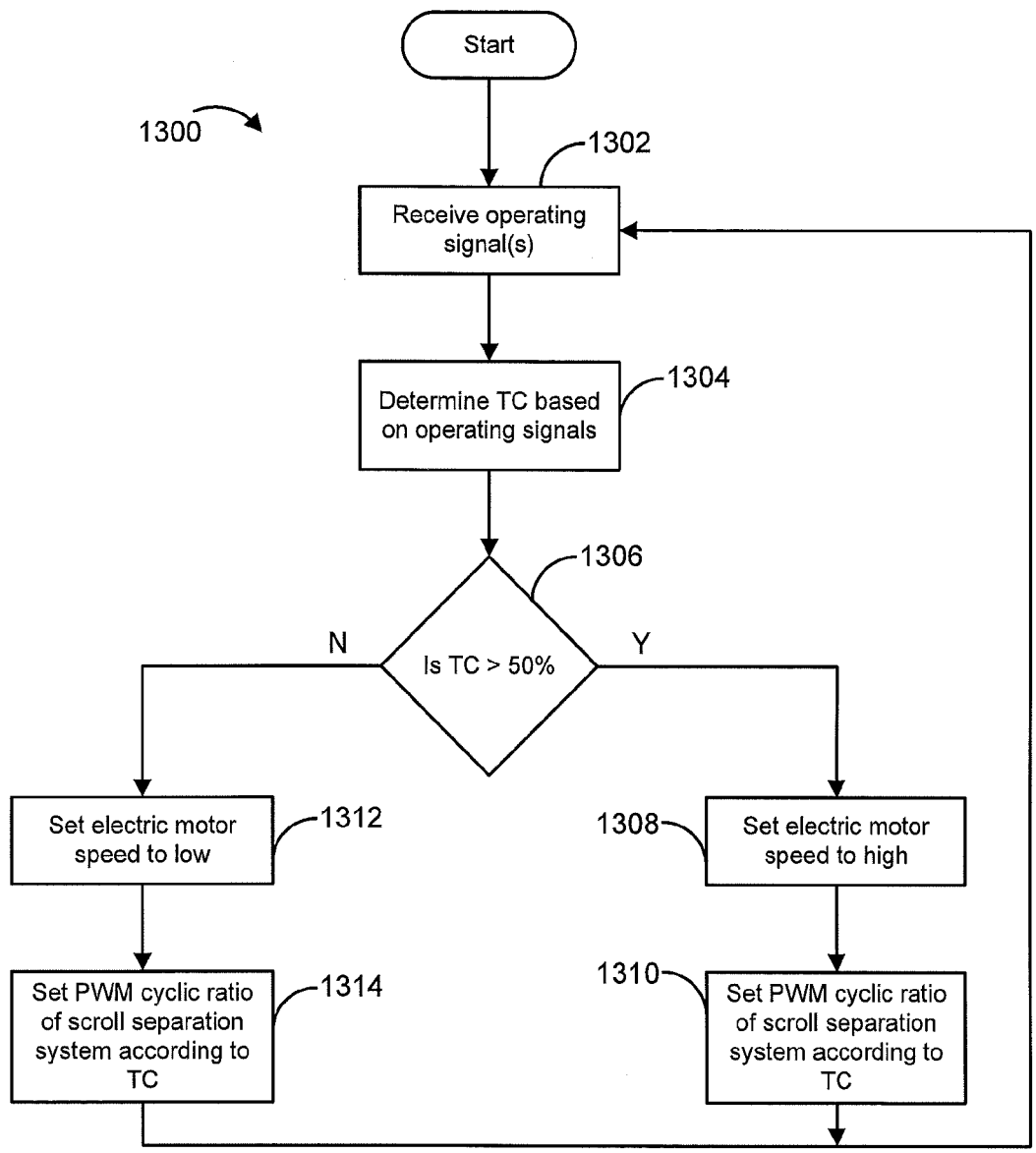
FIG. 13 is a flow chart of an operating algorithm for a scroll compressor with a scroll separation system.

With reference to FIG. 13, a flow chart illustrates an operating algorithm 1300 for scroll compressor 10a with two speed electric motor 12 and scroll separation system 32 as shown in FIGS. 1 and 2. In step 1302, controller 302 may receive one or more operating signals from refrigeration system sensors. For example, controller 302 may receive a discharge temperature signal, a discharge pressure signal, a suction temperature signal, a suction pressure signal, and/or any other suitable refrigeration sensor signal. In step 1304, controller 302 may determine TC for compressor based on received sensor signal(s). In step 1306, controller 302 may determine whether TC is greater than fifty percent.

In step 1308, when TC is greater than fifty percent, controller 302 may set electric motor speed to high. In step 1310, controller 302 may set the PWM cyclic ratio of scroll separation system 32 according to TC. For example, in step 1310 when TC is eighty percent, controller 302 may set the PWM frequency of solenoid valve 40 of scroll separation system 32 to achieve eighty percent capacity.

In step 1312, when TC is not greater than fifty percent, controller 302 may set electric motor speed to low. In step 1314, controller 302 may set the PWM cyclic ratio of scroll separation system 32 according to TC, while accounting for slower electric motor speed. For example, when TC is forty percent, controller 302 may set the PWM cyclic ratio of solenoid valve 40 of scroll separation system 32 to achieve eighty percent capacity. Thus, the lower electric motor speed may account for a decrease in compressor capacity by fifty percent. To further decrease capacity from fifty percent to forty percent, controller 302 may set the PWM cyclic ratio of solenoid valve 40 to eighty percent, i.e., eighty percent of fifty percent is forty percent capacity.

By modulating electric motor speed and adjusting PWM cyclic ratio of scroll separation system 32 accordingly, compressor efficiency is increased as compared with a system that modulates compressor capacity by adjusting PWM cyclic ratio without modulating electric motor speed. Compressor efficiency is particularly increased for operation at less than fifty percent capacity. By decreasing the speed of the electric motor 12 to achieve compressor capacity modulation less than fifty percent, electric power is more efficiently utilized as compared with a system that drives the electric motor 12 and orbiting scroll member 16 at full speed while separating the scroll members 14, 16 for more than half of the operating period.

With reference to FIG. 1, scroll compressor 10a may include a positive displacement oil pump 52. Traditionally, a centrifugal oil pump is used. However, a positive displacement oil pump 52 may be needed to provide additional oil pumping capacity when the electric motor 12 is operated at low speed.

Utilization of a two-pole/four-pole electric motor 12 may allow for speed modulation on-the-fly during operation of the scroll compressor 10a. For example, in four-pole mode, electric motor 12 has a lower locked rotor current, and a lower start current, than in two-pole mode. For this reason, electric motor 12 may be started in four-pole mode to limit the start current. When scroll compressor 10a is unloaded, electric motor 12 may switch to two-pole mode. Further, a rotor of electric motor 12 may be allowed to coast during compressor unloading. Electric power to electric motor 12 may be delivered again prior to the rotor stopping so as to keep the restart electric current low.

Figure 3:
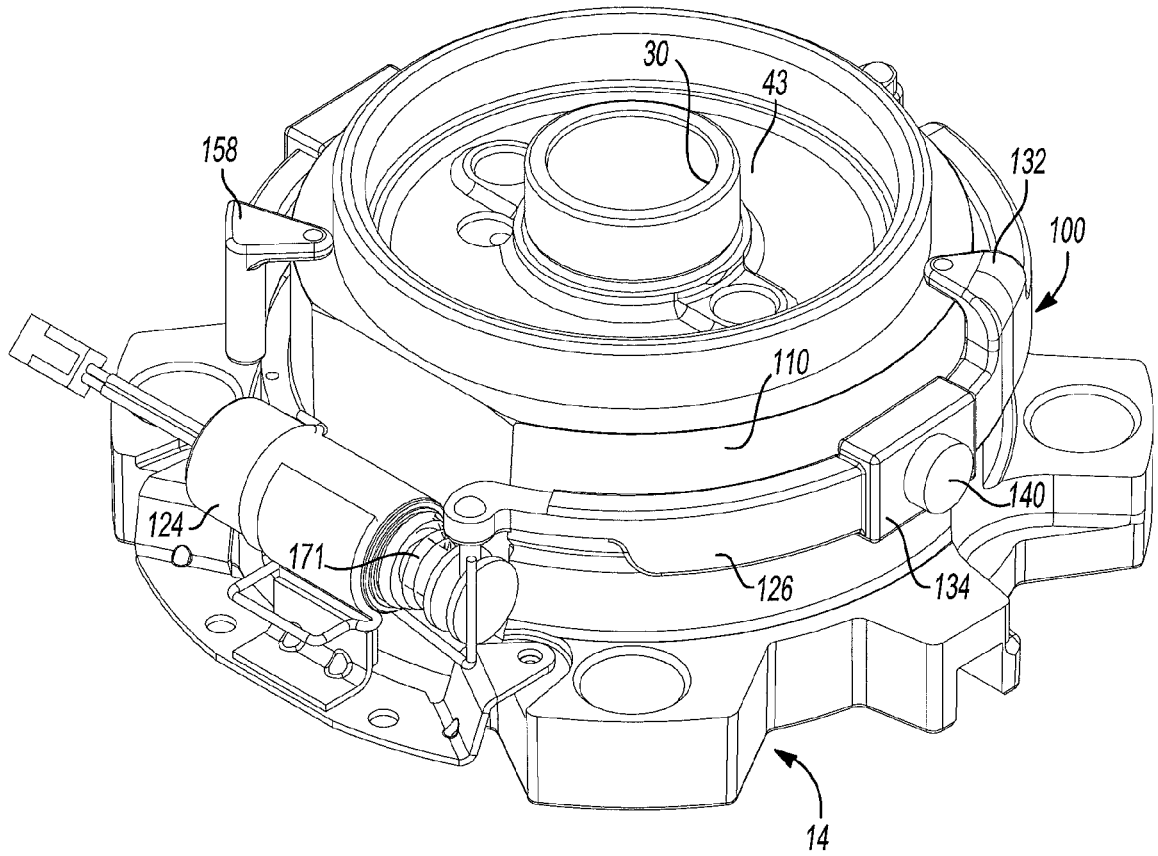
FIG. 3 is a perspective view of a delayed suction system including an annular valve ring.
Figure 5:
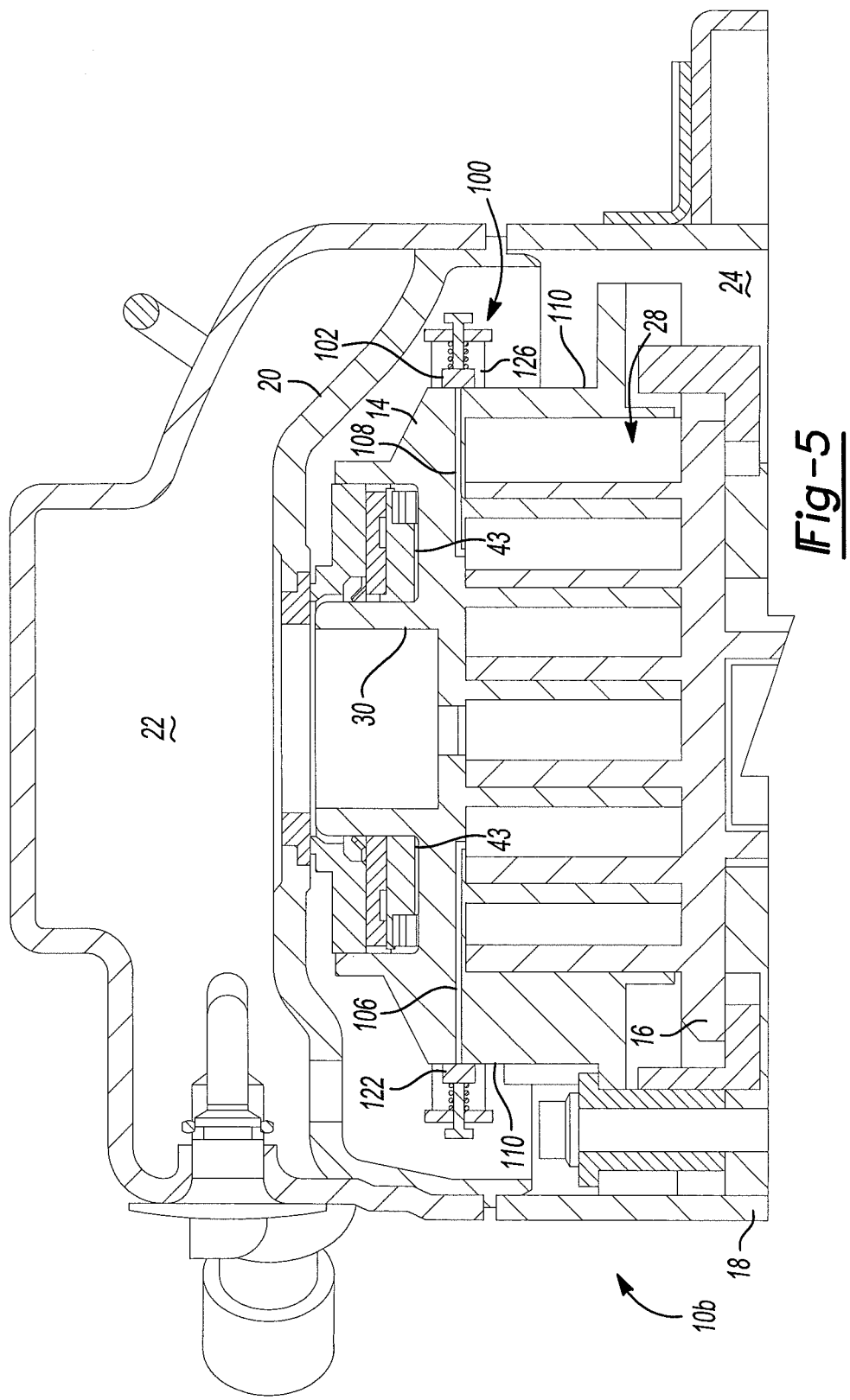
FIG. 5 is a section view of a scroll compressor with a delayed suction system.
Figure 6:
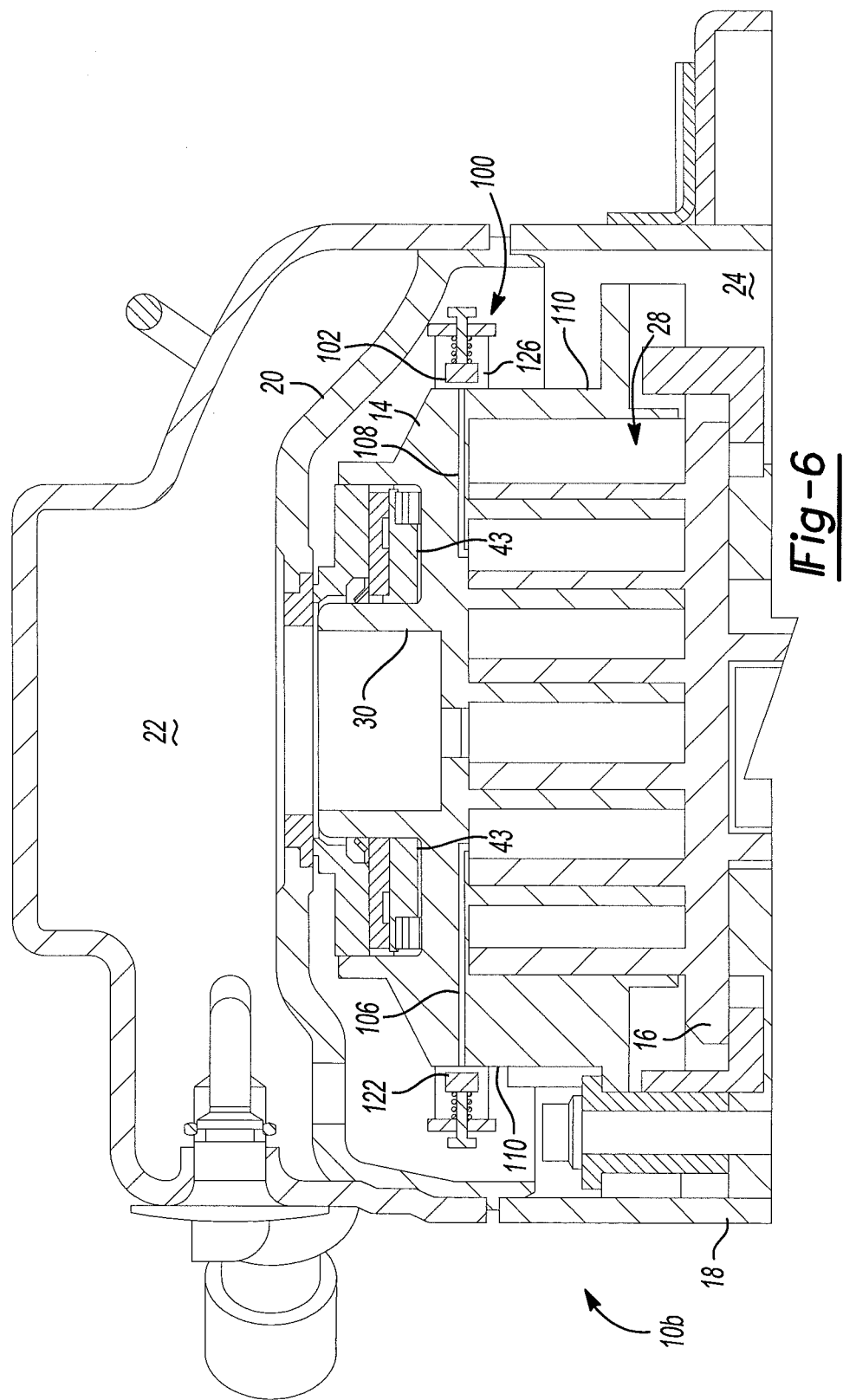
FIG. 6 is a section view of a scroll compressor with a delayed suction system.

With reference to FIGS. 3 to 6, another capacity control system may include a delayed suction system 100 utilizing an annular valve ring 126 for capacity modulation. Annular valve ring 126 may selectively release pressure from intermediate chambers within scroll members 14, 16 to create a leak path from the intermediate chambers to suction chamber 24. As shown in FIGS. 3, 5, and 6, annular valve ring 126 may attach to non-orbiting scroll member 14. Valves 102, 122 of annular valve ring 126 may be selectively opened to release pressure through chambers 106 and 108. Valves 102, 122 of annular valve ring 126 may be pulse width modulated to vary capacity.

Scroll compressor 10b shown in FIGS. 5 and 6 is similar to scroll compressor 10a shown in FIGS. 1 and 2, except scroll compressor 10b of FIGS. 5 and 6 includes annular valve ring 126 for compressor capacity modulation instead of scroll separation system 32. As discussed below with reference to FIGS. 7 to 9, a compressor may also be configured for capacity modulation via both the delayed suction approach and the scroll separation approach.

With reference to FIGS. 3 and 4, annular valve ring 126 may include an actuation mechanism 124 for selectively opening and closing valves 102, 122. Annular valve ring 126 may include a generally arcuate body, having pivot regions 132, 158. Valves 102, 122 may include first and second ends and an intermediate portion disposed therebetween. Intermediate portion may have a diameter generally similar to the diameter of an aperture in annular valve ring 126 and may be slidably disposed therein. Valve ends may have diameters larger than the diameter of aperture. Valves 102, 122 may be urged toward non-orbiting scroll member sidewall 110 by a biasing member such as a spring 170.

Actuation mechanism 124 may include a solenoid. In operation, when capacity modulation is desired, actuation mechanism 124 may provide for linear displacement of an actuation arm 171. More specifically, where actuation mechanism 124 includes a solenoid it may be controlled to allow linear displacement of actuation arm 171. Displacement of actuation arm 171 may cause displacement of annular valve ring 126 in a direction that has both radially outward and tangential components relative to non-orbiting scroll member. More specifically, displacement may cause rotation of annular valve ring 126 about pivot region 132, thereby displacing valve 102 from a first position to a second position radially outward from the first position where chamber 106 is unsealed. Further, rotation of annular valve ring 126 may cause displacement of valve 122 as well.

Activation of delayed suction system 100 may decrease compressor capacity by a percentage depending on the location of the chambers 106 and 108. For example, activation of delayed suction system 100 may decrease or step-down compressor capacity to sixty-seven percent, when the compressor is run at full speed and valves 102, 122 are open. Further, activation of the delayed suction system 100 when the compressor is run at low speed may decrease or step-down compressor capacity to thirty-three percent, i.e., fifty percent of sixty-seven percent is about thirty-three percent.

In addition, delayed suction system 100 may be operated by pulse width modulation including operating actuation mechanism 124 in a pulse width modulation manner. In such case, valves 102, 122 may be periodically opened for a portion of an operating cycle. Depending on the location of chambers 106 and 108, by operating delayed suction system 100 with pulse width modulation, capacity may be varied between one-hundred percent and sixty-seven percent when the compressor is run at full speed and between fifty percent and thirty-three percent when compressor is run at low speed.

With reference to FIG. 11, capacity modulation system may include delayed suction system 100 described above with reference to FIGS. 3 to 6. Controller 302 may control compressor capacity in accordance with refrigeration system load to maximize compressor efficiency by controlling the position of actuation mechanism 124 to activate delayed suction system 100. In addition to modulating compressor capacity with delayed suction system 100, controller 302 may also modulate compressor capacity by varying the speed of the electric motor 12 to maximize compressor efficiency.

Figure 14A:
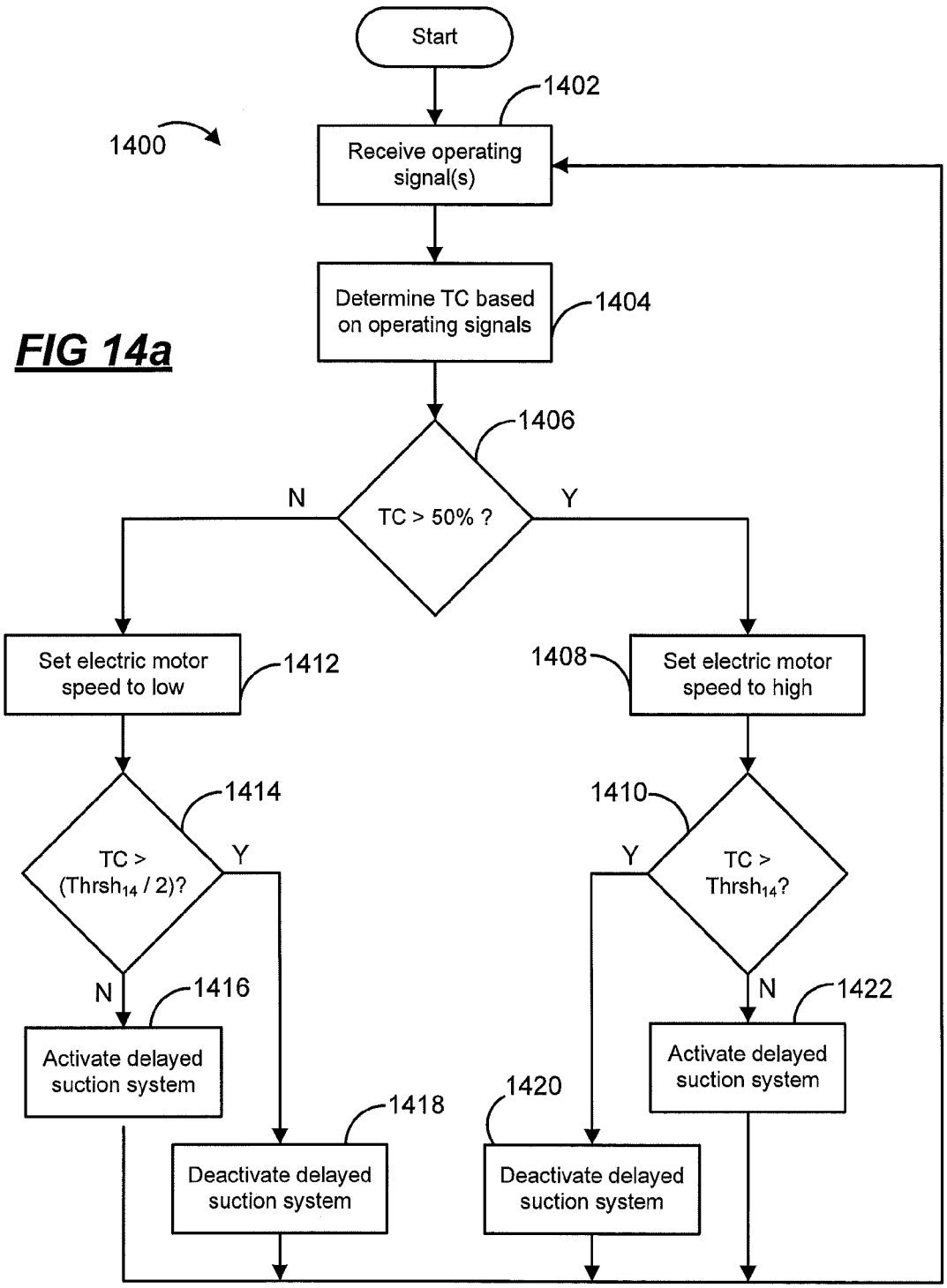
FIG. 14a is a flow chart of an operating algorithm for a scroll compressor with a delayed suction system.

With reference to FIG. 14a, a flow chart illustrates an operating algorithm 1400 for compressor 10b, having two speed electric motor 12 and delayed suction system 100. A computer-readable medium accessible to controller 302 may have computer executable instructions for controller 302 to execute operating algorithm 1400. In step 1402, controller 302 receives operating signal(s) from refrigeration system sensor(s). For example, controller 302 may receive a discharge temperature, a discharge pressure, a suction temperature, and/or a suction pressure. In step 1404, controller 302 estimates refrigeration system load based on the received signal(s) and determines TC for compressor based on estimated system load. In step 1406, controller 302 determines whether TC is greater than fifty percent.

In step 1408, when TC is greater than fifty percent, controller 302 sets electric motor speed to high. In step 1410, controller 302 determines whether TC is greater than a capacity threshold (Thrsh$_{14}$). For example, Thrsh$_{14}$ may be sixty-seven percent. In step 1420, when TC is greater than Thrsh$_{14}$, controller 302 deactivates delayed suction system 100, if it was previously activated, or continues to operate without activation of delayed suction system 100, if it was previously deactivated. Controller 302 may then loop back to step 1402 to receive operating signal(s). In step 1422, when TC is not greater than Thrsh$_{14}$, controller 302 may activate delayed suction system 100, if it was previously activated, or continue to operate with delayed suction system 100 activated, if it was previously activated. Controller 302 may then loop back to step 1402. For example, if Thrsh$_{14}$ is sixty-seven percent, and TC is determined to be sixty percent, controller 302 may set electric motor speed to high and activate delayed suction system 100.

In step 1412, when TC is not greater than fifty percent, controller 302 may set electric motor speed to low. In step 1414, controller 302 may determine whether TC is greater than Thrsh$_{14}$ divided by two. By comparing TC with half of Thrsh$_{14}$, controller 302 may account for the decrease of compressor capacity due to slower electric motor speed, as set in step 1412. In step 1416, when TC is not greater than half of Thrsh$_{14}$, controller 302 may activate delayed suction system 100, if it was previously activated, or continue to operate with delayed suction system 100 activated, it if was previously activated. In step 1418, when TC is greater than half of Thrsh$_{14}$, controller may deactivate delayed suction system 100, if it was previously activated, or continue to operate with delayed suction system 100 deactivated, if it was previously deactivated. Controller may then loop back to step 1402. For example, if Thrsh$_{14}$ is sixty-seven percent, and TC is determined to be thirty percent, controller 302 may set electric motor speed to low and activate delayed suction system 100.

By modulating electric motor speed and selectively activating delayed suction system 100, compressor efficiency is increased as compared with a system that modulates compressor capacity by activating delayed suction system 100 without modulating electric motor speed. By decreasing electric motor speed to achieve compressor capacity modulation less than fifty percent, electric power is more efficiently utilized as compared with a system that drives electric motor 12 and orbiting scroll member 16 at full speed while releasing pressure from intermediate chambers between orbiting and non-orbiting scroll members 14, 16.

Figure 14B:
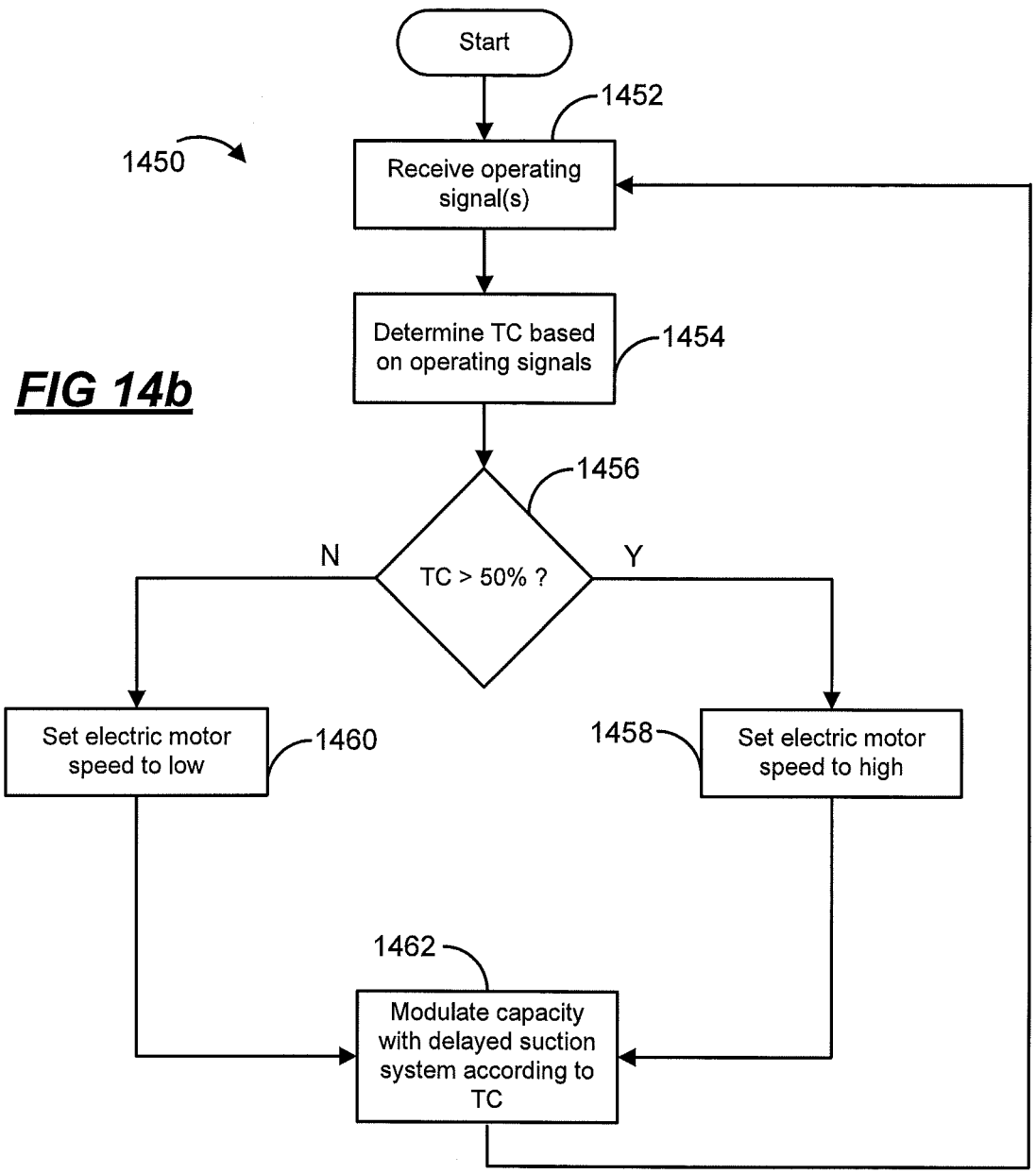
FIG. 14b is a flow chart of an operating algorithm for a scroll compressor with a delayed suction system.

With reference to FIG. 14b, a flow chart illustrates an operating algorithm 1450 for compressor 10b, having two speed electric motor 12 and delayed suction system 100. In operating algorithm 1450, delayed suction system 100 is operated with pulse width modulation. A computer-readable medium accessible to controller 302 may have computer executable instructions for controller 302 to execute operating algorithm 1450. In step 1452, controller 302 receives operating signal(s) from refrigeration system sensor(s). For example, controller 302 may receive a discharge temperature, a discharge pressure, a suction temperature, and/or a suction pressure. In step 1454, controller 302 estimates refrigeration system load based on the received signal(s) and determines TC for compressor based on estimated system load. In step 1456, controller 302 determines whether TC is greater than fifty percent.

In step 1458, when TC is greater than fifty percent, controller 302 sets electric motor speed to high. In step 1460, when TC is less than fifty percent, controller 302 sets the electric motor speed to low.

In step 1462, controller 302 may modulate capacity by pulse width modulating operation of delayed suction system 100 according to TC. For example, with the electric motor speed set to high, controller 302 may use pulse width modulation when TC is between one-hundred percent and a capacity threshold ($Thrsh_{14}$). As with FIG. 14a, $Thrsh_{14}$ may be sixty-seven percent. When TC is less than $Thrsh_{14}$, controller 302 may operate delayed suction system 100 with valves 102, 122 fully open for the operating cycle. Likewise, with the electric motor speed set to low, controller 302 my use pulse width modulation when TC is between fifty percent and half of $Thrsh_{14}$. When TC is less than half of $Thrsh_{14}$, with electric motor speed set to low, controller 302 may operate delayed suction system 100 with valves 102, 122 fully open for the operating cycle.

By modulating electric motor speed and pulse width modulating activation of delayed suction system 100, TC is more accurately met and compressor efficiency is increased.

Figure 7:
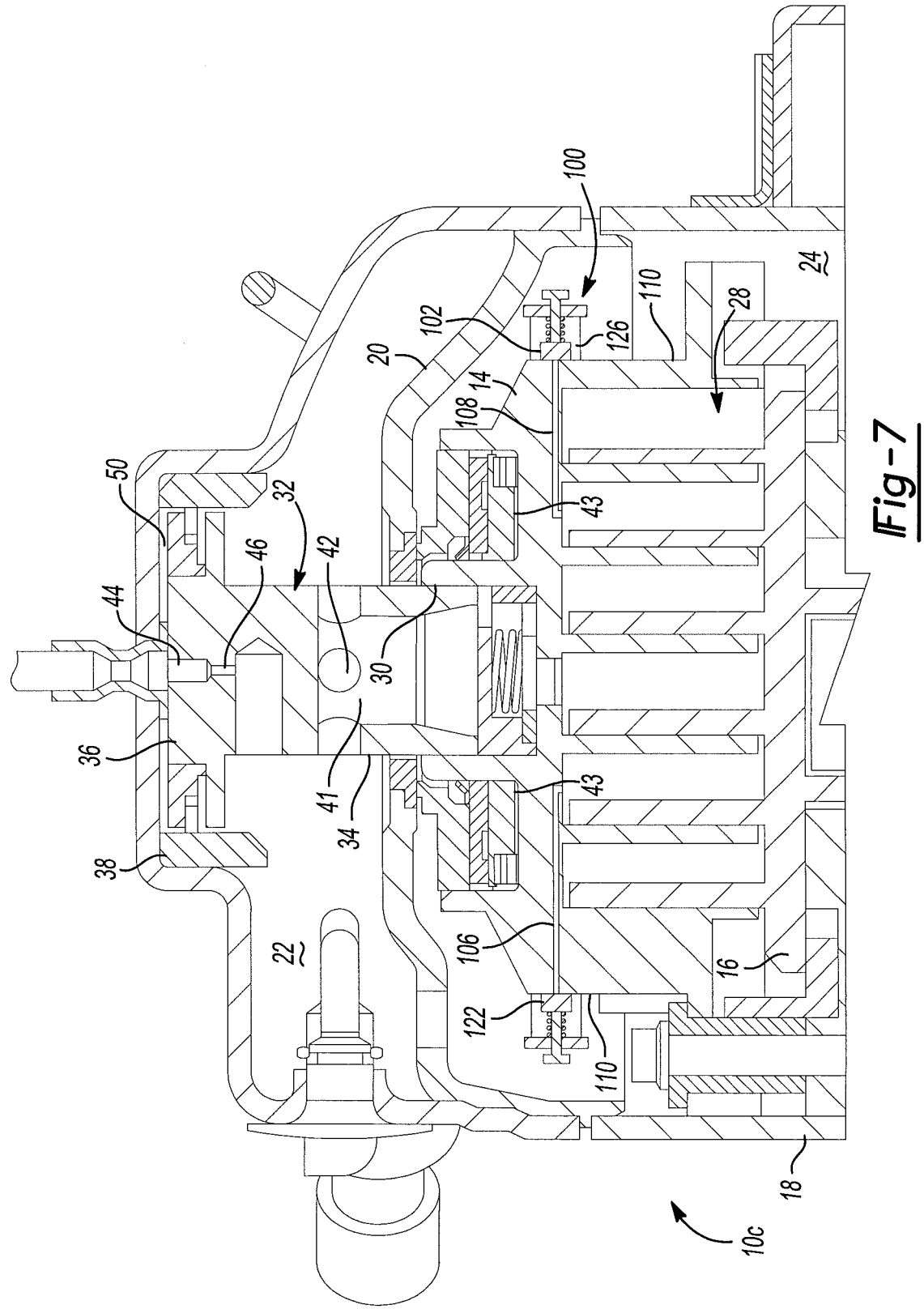
FIG. 7 is a section view of a scroll compressor with a scroll separation system and a delayed suction system.

With reference to FIG. 7, a compressor 10c may include both scroll separation system 32 and delayed suction system 100 to provide multiple leak path alternatives. In such case, scroll compressor 10c may modulate capacity by modulating the speed of the electric motor 12, such as switching between a high speed and a low speed, by periodically separating scroll members 14, 16, as discussed above with reference to FIGS. 1 and 2, and by releasing pressure from intermediate chambers within scroll members 14, 16, as discussed above with reference to FIGS. 3 to 6.

With reference to FIG. 11, scroll compressor 10c may be controlled by controller 302 that modulates compressor capacity in accordance with refrigeration system load by controlling the speed of the electric motor 12, activation of scroll separation system 32, and activation of delayed suction system 100. In addition, scroll separation system 32 and delayed suction system 100 may be operated with pulse width modulation. Controller 302 may control the PWM cyclic ratio of scroll separation system 32 and/or delayed suction system 100.

Figure 15A:
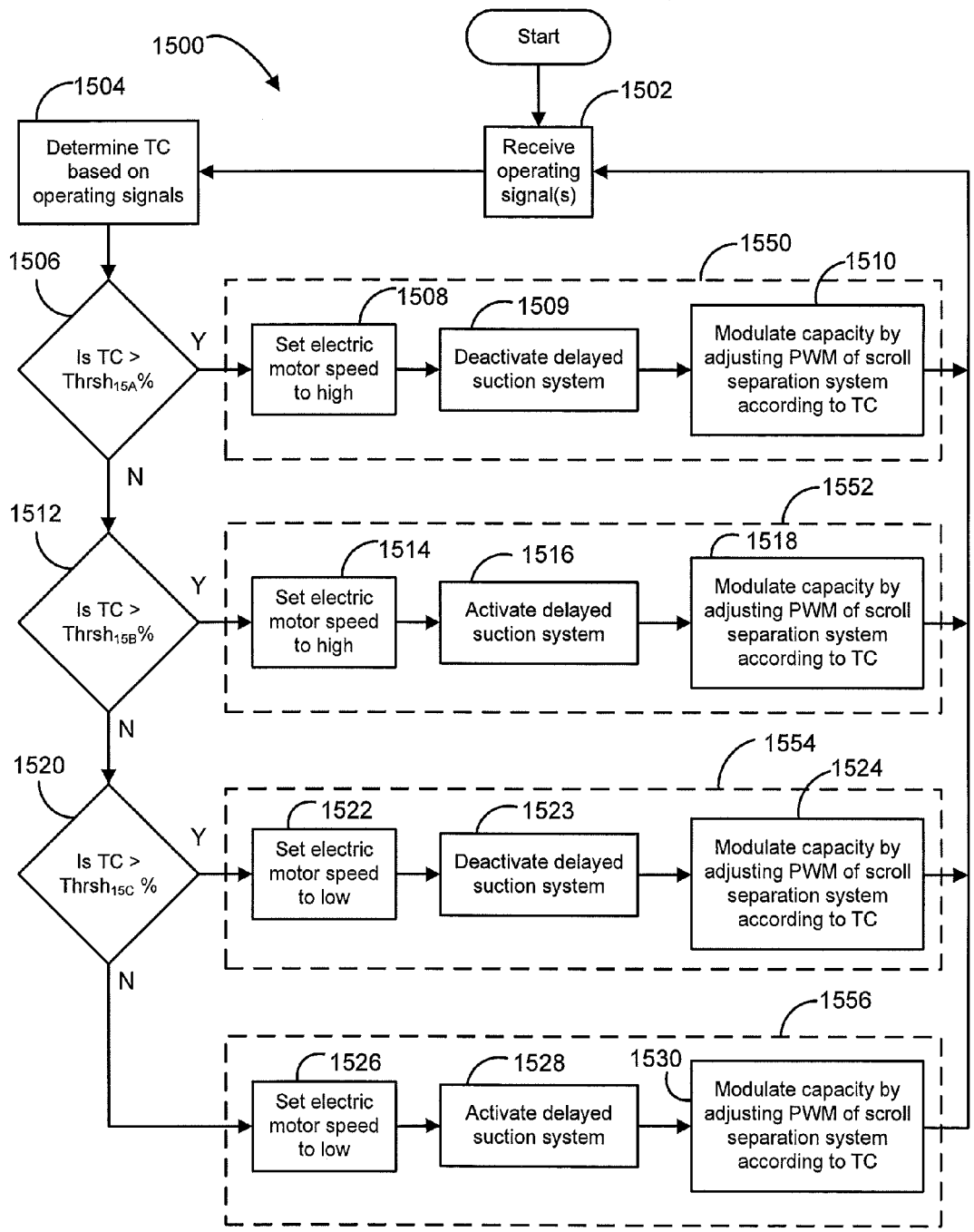
FIG. 15a is a flow chart of an operating algorithm for a scroll compressor with a scroll separation system and a delayed suction system.

With reference to FIG. 15a, a flow chart illustrates an operating algorithm 1500 for scroll compressor 10c, having two speed electric motor 12, delayed suction system 100, and scroll separation system 32, as shown in FIG. 7. A computer-readable medium accessible to controller 302 may have computer executable instructions for controller 302 to execute operating algorithm 1500.

In step 1502, controller 302 receives operating signal(s) from refrigeration system sensor(s). For example, controller 302 may receive a discharge temperature, a discharge pressure, a suction temperature, and/or a suction pressure. In step 1504, controller 302 estimates refrigeration system load based on the received signal(s) and determines TC for scroll compressor 10c based on estimated system load. Controller 302 may compare TC with one or more thresholds to determine a subsequent control strategy. As illustrated in FIG. 15 and discussed below, TC may be compared with a first threshold ($Thrsh_{15A}$), a second threshold ($Thrsh_{15B}$), and/or a third threshold $Thrsh_{15C}$. $Thrsh_{15A}$, $Thrsh_{15B}$, and $Thrsh_{15C}$ may be chosen to maximize efficiency of scroll compressor 10c. For example, $Thrsh_{15A}$ may be sixty-seven percent, $Thrsh_{15B}$ may be fifty percent, and $Thrsh_{15C}$ may be thirty-three percent. Based on the comparison of target capacity with $Thrsh_{15A}$, $Thrsh_{15B}$, and $Thrsh_{15C}$ one of a first control branch 1550, a second control branch 1552, a third control branch 1554, and a fourth control branch 1556 may be executed during an iteration of the algorithm 1500 in accordance with the following table:

TABLE 1

| TC Comparison | Control Branch |
| --- | --- |
| TC greater than $Thrsh_A$ | Execute control branch 1550 |
| TC between $Thrsh_{15A}$ and $Thrsh_{15B}$ | Execute control branch 1552 |
| TC between $Thrsh_{15B}$ and $Thrsh_{15c}$ | Execute control branch 1554 |
| TC less than $Trsh_A/2$ | Execute control branch 1556 |

When $Thrsh_{15A}$ is sixty-seven percent, $Thrsh_{15B}$ is fifty percent, and $Thrsh_{15C}$ is thirty-three percent, one of control branch 1550, control branch 1552, control branch 1554, and control branch 1556 may be executed in accordance with the following table:

TABLE 2

| TC Comparison | Control Branch |
| --- | --- |
| TC greater than 67% | Execute control branch 1550 |
| TC between 67% and 50% | Execute control branch 1552 |
| TC between 50% and 33% | Execute control branch 1554 |
| TC less than 33% | Execute control branch 1556 |

The above example threshold values are exemplary only. Other values may be used for $Thrsh_{15A}$, $Thrsh_{15B}$, and $Thrsh_{15C}$.

In step 1506, controller 302 may determine whether TC is greater than $Thrsh_A$. When TC is greater than $Thrsh_A$, controller 302 may execute control branch 1550. Specifically, in step 1508, controller 302 may set electric motor speed to high. In step 1509, controller 302 may deactivate delayed suction system 100, if it was previously activated, or continue to operate with delayed suction system 100 deactivated, if it was previously activated. In step 1510, controller 302 may then modulate capacity of scroll compressor 10c with scroll separation system 32 by periodically separating scroll members 14, 16 to create a leak path. Controller 302 may adjust the PWM cyclic ratio of scroll separation system 32 to modulate compressor capacity according to TC. Controller 302 then returns to step 1502 and receives operating signal(s) again.

In step 1512, controller 302 may determine whether TC is greater than $Thrsh_B$. When TC is greater than $Thrsh_B$, controller 302 may execute branch 1552. Specifically, in step 1514, controller 302 may set electric motor speed to high. In step 1516, controller may activate delayed suction system 100, if it was previously deactivated, or continue to operate with delayed suction system 100 activated, if it was previously activated. In step 1518, controller 302 may then modulate capacity of scroll compressor 10c with scroll separation system 32 by periodically separating scroll members 14, 16 to create a leak path. Controller 302 may adjust PWM cyclic ratio of scroll separation system 32 to modulate compressor capacity according to TC. Controller 302 then returns to step 1502 and receives operating signal(s) again.

In step 1520, controller 302 may determine whether TC is greater than $Thrsh_{15C}$. When TC is greater than $Thrsh_{15C}$, controller 302 may execute branch 1554. Specifically, in step 1522, controller 302 may set electric motor speed to low. In step 1523, controller 302 may deactivate delayed suction system 100, if it was previously activated, or continue to operate with delayed suction system 100 deactivated, if it was previously deactivated. In step 1524, controller 302 may modulate capacity of the scroll compressor 10c with scroll separation system 32 by periodically separating the scroll members 14, 16 to create a leak path. The controller 302 may adjust PWM cyclic ratio of scroll separation system 32 to modulate compressor capacity according to TC. Controller 302 then returns to step 1502 and receives operating signal(s) again.

In step 1520, when TC is not greater than $Thrsh_{15C}$, controller 302 may execute branch 1556. Specifically, in step 1526, controller may set electric motor speed to high. In step 1528, controller 302 may activate delayed suction system 100, if it was previously deactivated, or continue to operate with delayed suction system 100 activated, if it was previously activated. In step 1530, controller 302 may then modulate capacity of scroll compressor 10c with scroll separation system 32 by periodically separating the scroll members 14, 16 to create a leak path. Controller 302 may adjust PWM cyclic ratio of scroll separation system 32 to modulate compressor capacity according to TC. Controller 302 then returns to step 1502 and receives operating signal(s).

In this way, controller 302 may accurately and efficiently adjust compressor capacity to meet TC by modulating electric motor speed, activation of scroll separation system 32, and delayed suction system 100.

Figure 15B:
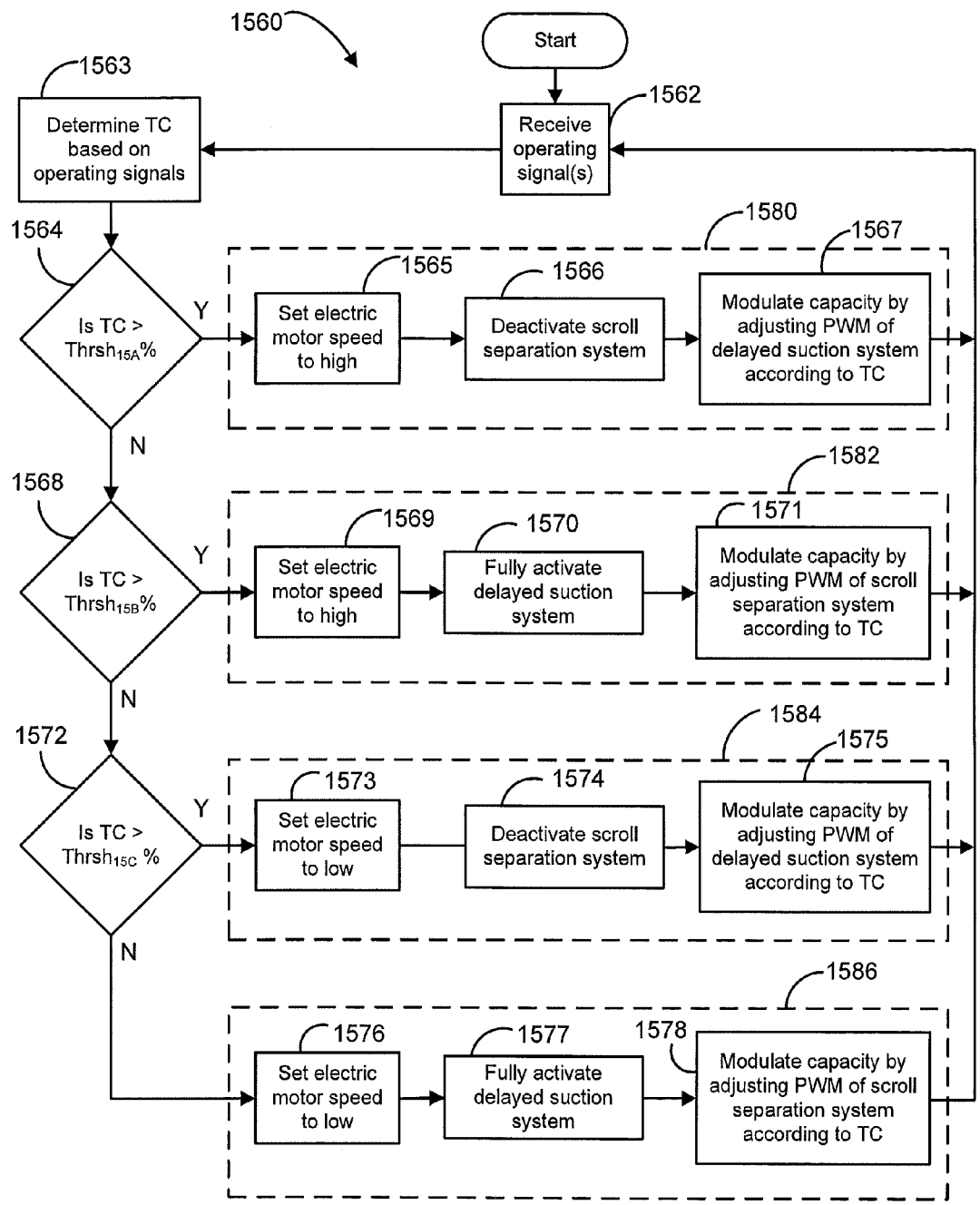
FIG. 15b is a flow chart of an operating algorithm for a scroll compressor with a scroll separation system and a delayed suction system.

With reference to FIG. 15b, a flow chart illustrates an operating algorithm 1560 for scroll compressor 10c, having two speed electric motor 12, delayed suction system 100, and scroll separation system 32, as shown in FIG. 7. The operating algorithm 1560 may be used with scroll separation system 32 and delayed suction system 100 each operable to be pulse width modulated. A computer-readable medium accessible to controller 302 may have computer executable instructions for controller 302 to execute operating algorithm 1560.

In step 1562, controller 302 receives operating signal(s) from refrigeration system sensor(s). For example, controller 302 may receive a discharge temperature, a discharge pressure, a suction temperature, and/or a suction pressure. In step 1563, controller 302 estimates refrigeration system load based on the received signal(s) and determines TC for scroll compressor 10c based on estimated system load. Controller 302 may compare TC with one or more thresholds to determine a subsequent control strategy. As discussed above with reference to FIG. 15a, TC may be compared with $Thrsh_{15A}$, $Thrsh_{15B}$, and/or $Thrsh_{15C}$, which may be chosen to maximize efficiency of scroll compressor 10c. $Thrsh_{15A}$ may be sixty-seven percent, $Thrsh_{15B}$ may be fifty percent, and $Thrsh_{15C}$ may be thirty-three percent. Based on the comparison of target capacity with $Thrsh_{15A}$, $Thrsh_{15B}$, and $Thrsh_{15C}$ one of a first control branch 1580, a second control branch 1582, a third control branch 1584, and a fourth control branch 1586 may be executed during an iteration of the algorithm 1560 in accordance with the following table:

TABLE 3

| TC Comparison | Control Branch |
| --- | --- |
| TC greater than $Thrsh_A$ | Execute control branch 1580 |
| TC between $Thrsh_{15A}$ and $Thrsh_{15B}$ | Execute control branch 1582 |
| TC between $Thrsh_{15B}$ and $Thrsh_{15C}$ | Execute control branch 1584 |
| TC less than $Trsh_A/2$ | Execute control branch 1586 |

When $Thrsh_{15A}$ is sixty-seven percent, $Thrsh_{15B}$ is fifty percent, and $Thrsh_{15C}$ is thirty-three percent, one of control branch 1580, control branch 1582, control branch 1584, and control branch 1586 may be executed in accordance with the following table:

TABLE 4

| TC Comparison | Control Branch |
| --- | --- |
| TC greater than 67% | Execute control branch 1580 |
| TC between 67% and 50% | Execute control branch 1582 |
| TC between 50% and 33% | Execute control branch 1584 |
| TC less than 33% | Execute control branch 1586 |

The above example threshold values are exemplary only. Other values may be used for $Thrsh_{15A}$, $Thrsh_{15B}$ and $Thrsh_{15C}$.

In step 1564, controller 302 may determine whether TC is greater than $Thrsh_A$. When TC is greater than $Thrsh_A$, controller 302 may execute control branch 1580. Specifically, in step 1565, controller 302 may set electric motor speed to high. In step 1566, controller 302 may deactivate scroll separation system 32 such that scroll members 14, 16 are not separated. In step 1567, controller 302 may modulate compressor capacity by adjusting PWM cyclic ratio of delayed suction system 100, according to TC. By pulse width modulating delayed suction system 100, controller 302 may be able to accurately and efficiently meet TC. Controller 302 may then return to step 1562 and receive operating signal(s) again.

In step 1568, controller 302 may determine whether TC is greater than $Thrsh_B$. When TC is greater than $Thrsh_B$, controller 302 may execute branch 1582. Specifically, in step 1569, controller 302 may set electric motor speed to high. In step 1570, controller may fully activate delayed suction system 100 by opening valves 102, 122. In step 1571, controller 302 may modulate capacity of scroll compressor 10c with scroll separation system 32 by periodically separating scroll members 14, 16 to create a leak path. Controller 302 may adjust PWM cyclic ratio of scroll separation system 32 to modulate compressor capacity according to TC. Controller 302 may then return to step 1562 and receive operating signal (s) again.

In step 1572, controller 302 may determine whether TC is greater than $Thrsh_{15C}$. When TC is greater than $Thrsh_{15C}$, controller 302 may execute branch 1584. Specifically, in step 1573, controller 302 may set electric motor speed to low. In step 1574, controller 302 may deactivate scroll separation system 32 such that scroll members 14, 16 are not separated. In step 1575, controller 302 may modulate compressor capacity by adjusting PWM cyclic ratio of delayed suction system 100, according to TC. By pulse width modulating delayed suction system 100, controller 302 may be able to accurately and efficiently meet TC. Controller 302 may then return to step 1562 and receive operating signal(s) again.

In step 1572, when TC is not greater than $Thrsh_{15C}$, controller 302 may execute branch 1586. Specifically, in step 1576, controller may set electric motor speed to high. In step 1577, controller 302 may fully activate delayed suction system 100, if it was previously deactivated, or continue to operate with delayed suction system 100 by opening valves 122, 102. In step 1578, controller 302 may then modulate capacity of scroll compressor 10c with scroll separation system 32 by periodically separating scroll members 14, 16 to create a leak path. Controller 302 may adjust PWM cyclic ratio of scroll separation system 32 to modulate compressor capacity according to TC. Controller 302 then returns to step 1562 and receives operating signal(s) again.

In this way, controller 302 modulates compressor capacity by switching electric motor speed between high and low, by creating a leak path with scroll separation system 32 and by creating a leak path with delayed suction system 100. By pulse width modulating delayed suction system 100 with electric motor speed set to high, controller 302 may be able to accurately and efficiently meet a first predetermined capacity range. By pulse width modulating scroll separation system 32 with electric motor speed set to high and delayed suction system 100 fully activated, controller may be able to accurately and efficiently meet a second predetermined capacity range. By pulse width modulating delayed suction system 100 with electric motor speed set to low, controller 302 may be able to accurately and efficiently meet a third predetermined capacity range. By pulse width modulating scroll separation system 32 with electric motor speed set to low and delayed suction system 100 fully activated, controller may be able to accurately and efficiently meet a fourth predetermined capacity range.

Figure 8:
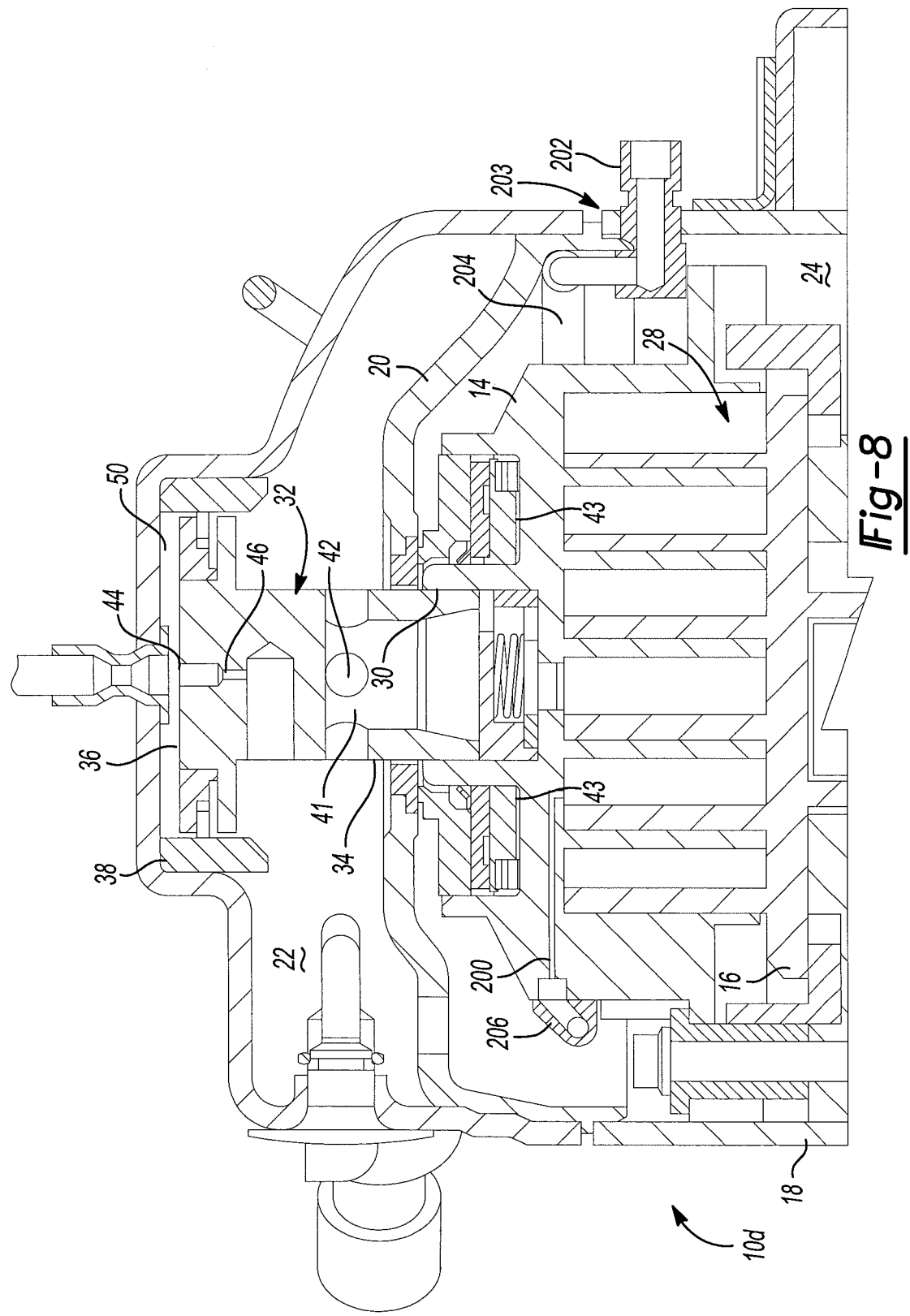
FIG. 8 is a section view of a scroll compressor with a scroll separation system and a refrigerant injection system.
Figure 9:
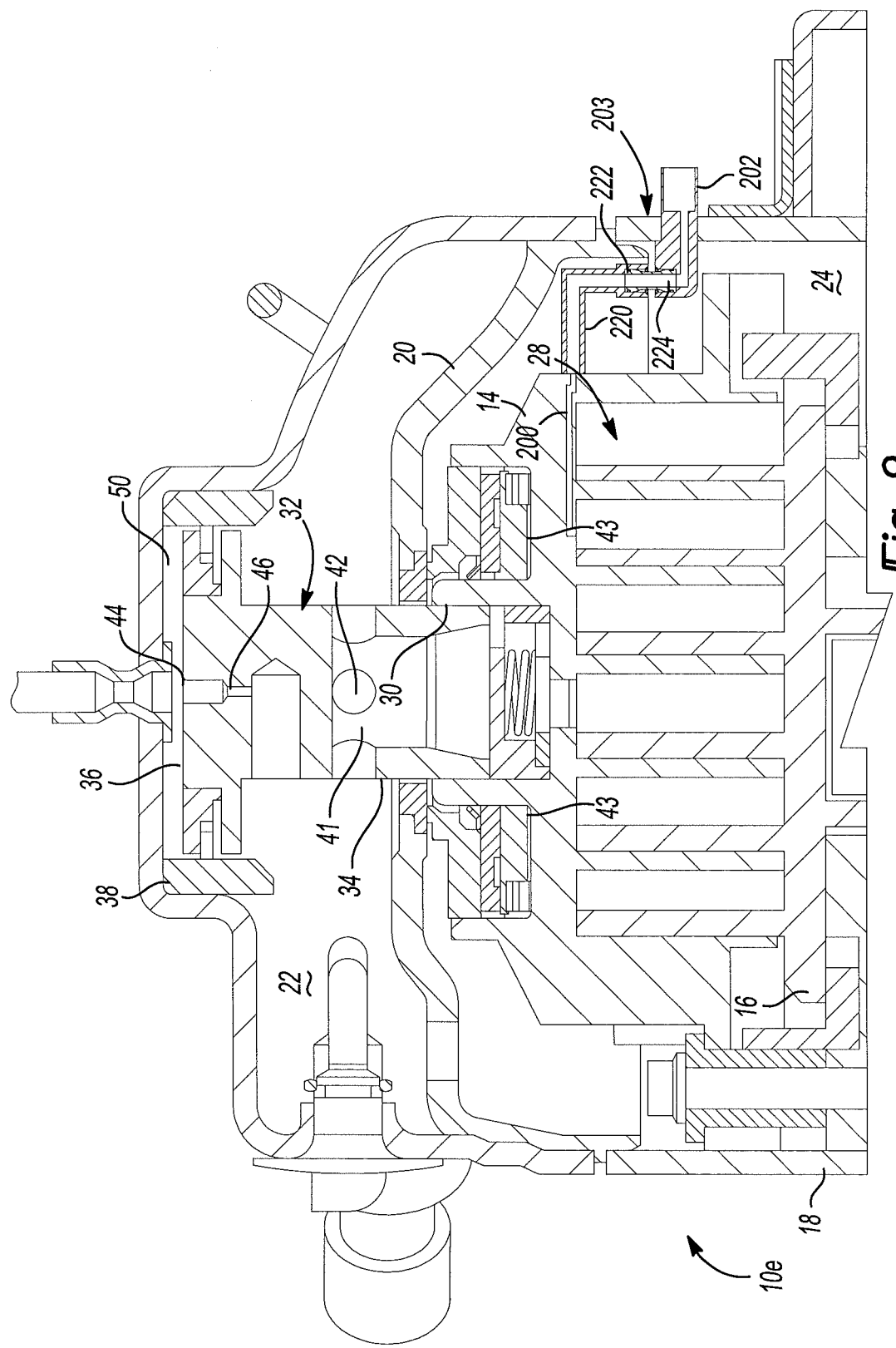
FIG. 9 is a section view of a scroll compressor with a scroll separation system and a refrigerant injection system.

With reference to FIGS. 8 and 9, in addition to the capacity control systems described above, a scroll compressor may also be configured with a refrigerant injection system 203 for injecting refrigerant into intermediate pressurized moving chambers. A scroll compressor 10d, 10e may be configured with refrigerant injection system 203 and scroll separation system 32. Refrigerant injection system 203 may also be used with delayed suction system 100.

A shell injection fitting 202 extends through shell 18. With reference to FIG. 8, shell injection fitting 202 may be connected to a flexible tube 204. Flexible tube 204 may be connected to a scroll member injection fitting 206 which may be secured to non-orbiting scroll member 14. Flexible tube 204 allows shell injection fitting 202 to communicate with scroll member injection fitting 206 while non-orbiting scroll member 14 is axially separated from orbiting scroll member 16. In this way, flexible tube 204 allows non-orbiting scroll member to move axially without disconnection of shell injection fitting 202 from scroll member injection fitting 206. Scroll member injection fitting 206 is connected to chamber 200 extending radially within non-orbiting scroll member 14. Chamber 200 may be connected to an intermediate moving pressure chamber defined by the intermeshing non-orbiting scroll member 14 and orbiting scroll member 16. Refrigerant may be injected into the intermediate moving pressure chamber through chamber 200, scroll member injection fitting 206, flexible tube 204, and shell injection fitting 202 to increase capacity of scroll compressor 10d.

With reference to FIG. 9, shell injection fitting 202 may be connected to a slidable connector 224. Slidable connector 224 may be connected to a tube 220 connected to non-orbiting scroll member 14. Tube 220 may be connected to chamber 200 extending radially within non-orbiting scroll member 14. Chamber 200 may be connected to an intermediate moving pressure chamber defined by the intermeshing non-orbiting scroll member 14 and orbiting scroll member 16. Refrigerant may be injected into the intermediate moving pressure chamber through chamber 200, tube 220, slidable connector 224, and shell injection fitting 202 to increase capacity of scroll compressor 10e.

Figure 10:
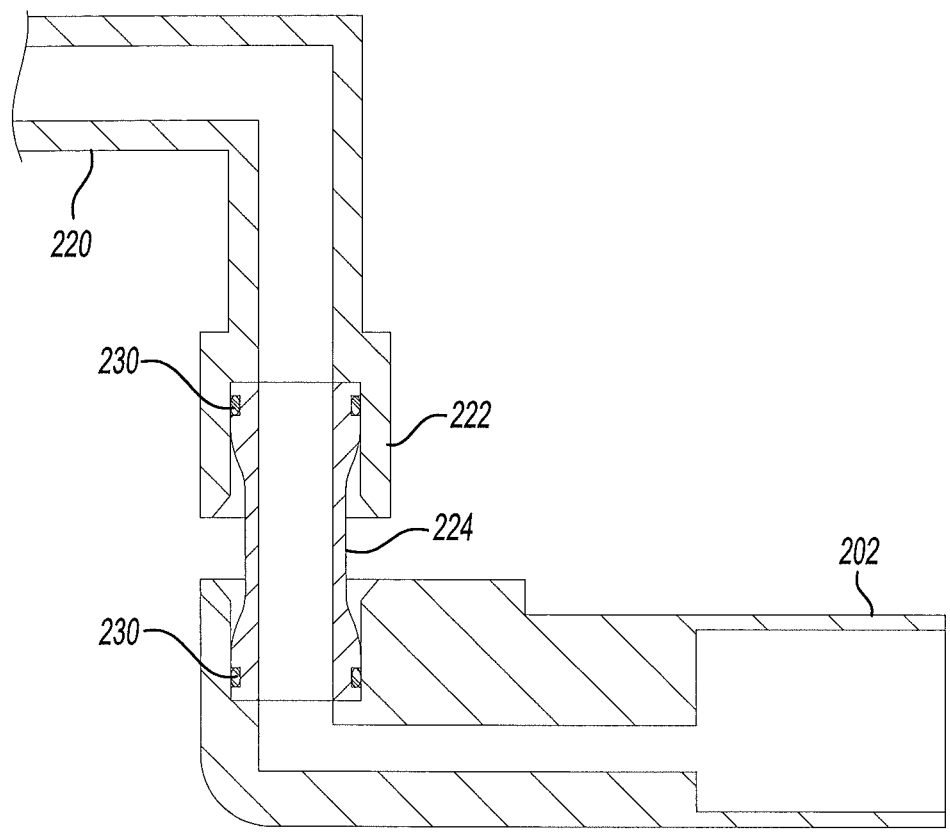
FIG. 10 is a section view of a refrigerant injection system.

With reference to FIG. 10, shell injection fitting 202, slidable connector 224, and tube 220 are shown. Slidable connector 224 may include sealing elements 230. Sealing elements 230 may be elastomer rings. Slidable connector 224 may allow shell injection fitting 202 to communicate with tube 220 while non-orbiting scroll member 14 is axially separated from orbiting scroll member 16. In this way, slidable connector 224 allows non-orbiting scroll member 14 to move axially without disconnection of shell injection fitting 202 from tube 222.

Figure 16:
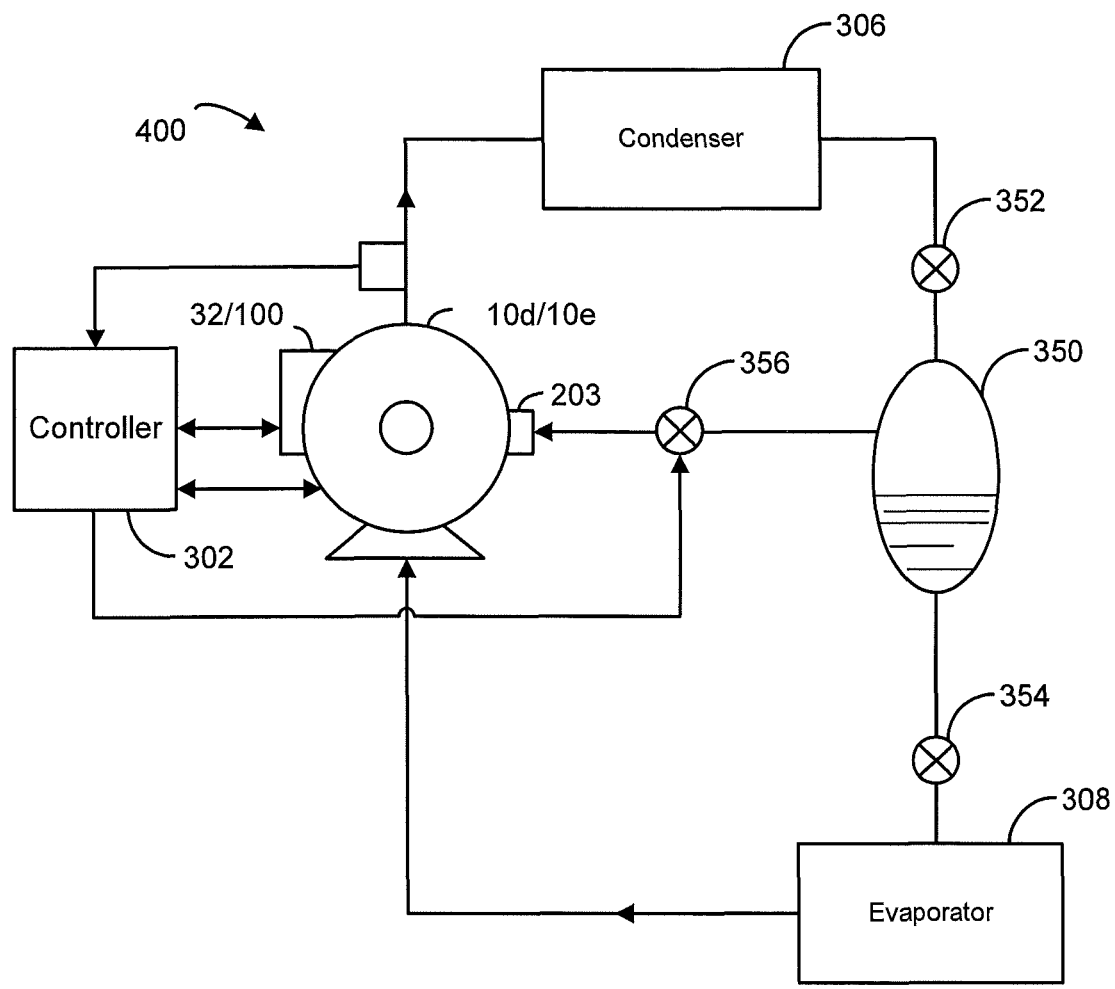
FIG. 16 is a view of a refrigeration system including a refrigerant injection system.

With reference to FIG. 16, a refrigeration system 400 includes scroll compressor 10d/10e configured with refrigerant injection system 203, condenser 306, a first expansion valve or throttle 352, a flash tank or economizer 350, a second expansion valve or throttle 354, evaporator 308 and piping interconnecting the components as shown. Refrigerant is compressed by scroll compressor 10d/10e and discharged to condenser 306. Refrigerant passes through expansion valve 352 and expands in flash tank 350 where it is separated into gas and liquid. The gaseous refrigerant further passes through piping to be introduced into compressor by a refrigerant injection system 203 described above with reference to FIGS. 8, 9, and 10. The remaining refrigerant further expands in expansion valve 354 and is vaporized in evaporator 308 and again taken into compressor.

The incorporation of flash tank 350 and the refrigerant injection system 203 allows the compressor capacity to increase above the fixed capacity of scroll compressor 10d/10e. For example, when electric motor 12 is operated at high speed, capacity of scroll compressor 10d/10e may be increased by approximately twenty percent to provide scroll compressor 10d/10e with one hundred and twenty percent of its normal full capacity. When electric motor 12 is operated at low speed, the capacity of the compressor may be increased by approximately ten percent to provide a compressor with sixty percent of its normal full capacity. A solenoid valve 356 or other suitable refrigerant control mechanism may be positioned within piping. The amount of percent increase in the capacity of scroll compressor 10d/10e can be controlled by PWM of the solenoid valve 356. By using refrigerant injection system 203 along with another compressor modulation system, compressor capacity may be provided anywhere between zero percent and one hundred and twenty percent. Controller 302 may also control PWM of solenoid valve 356 to control refrigerant injection.

Figure 17:
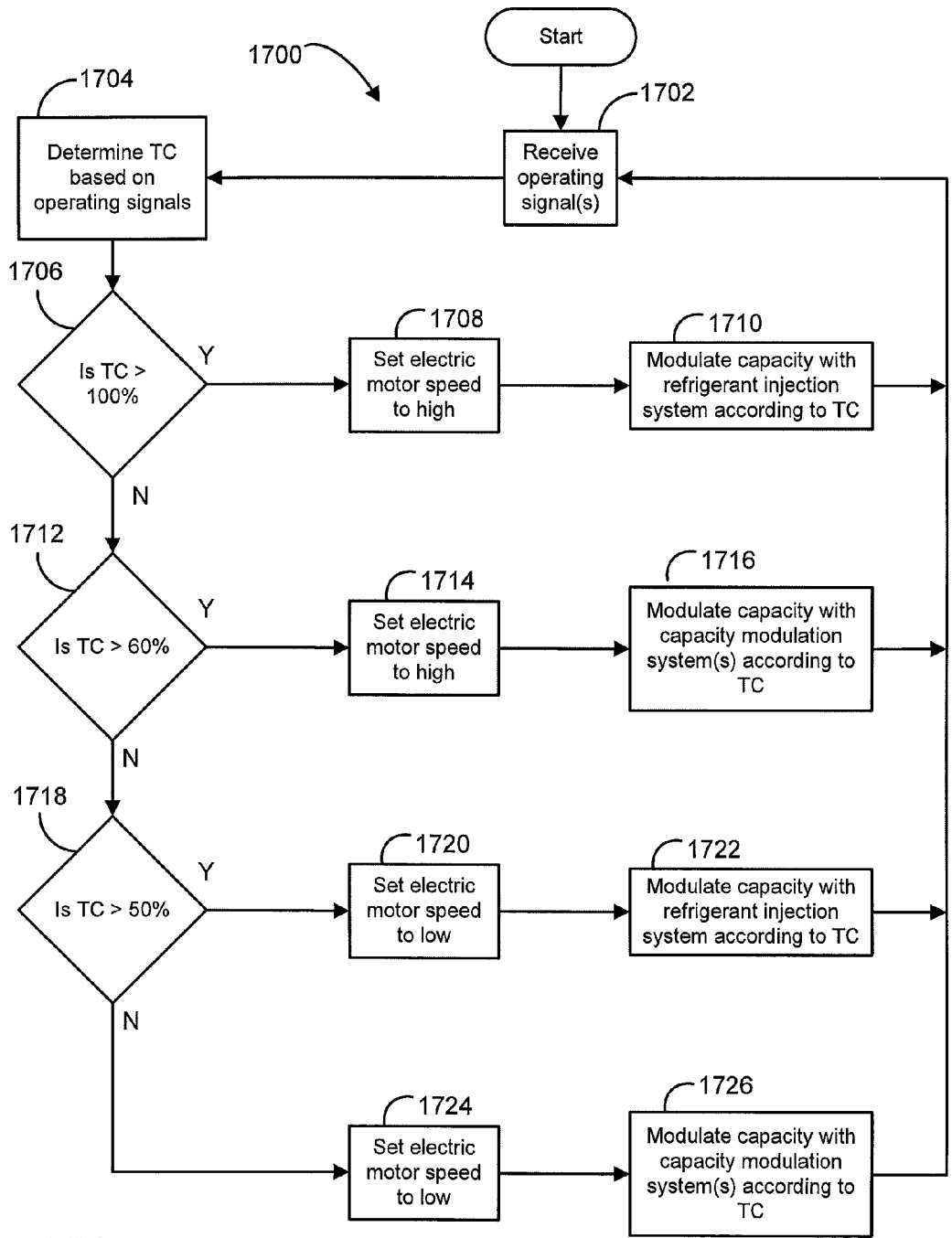
FIG. 17 is a flow chart of an operating algorithm for a scroll compressor with a refrigerant injection system.

With reference to FIG. 17, a flow chart illustrates an operating algorithm 1700 for scroll compressor 10d/10e, having electric motor 12, refrigerant injection system 203, and capacity modulation system(s), such as scroll separation system 32 and/or delayed suction system 100. A computer-readable medium accessible to controller 302 may have computer executable instructions for controller 302 to execute operating algorithm 1700.

In step 1702, controller 302 receives operating signal(s) from refrigeration system sensor(s). For example, controller 302 may receive a discharge temperature, a discharge pressure, a suction temperature, and/or a suction pressure. In step 1704, controller 302 estimates refrigeration system load based on the received signal(s) and determines TC for compressor based on estimated system load.

In step 1706, controller 302 determines whether TC is greater than one hundred percent. When TC is greater than one hundred percent, controller 302 may set the speed of electric motor 12 to high in step 1708 and may modulate compressor capacity with refrigerant injection system in step 1710. Controller 302 may then return to step 1702 and receive operating signal(s) again.

In step 1712, controller 302 may determine whether TC is greater than sixty percent. When TC is greater than sixty percent, controller 302 may set the speed of electric motor 12 to high in step 1714 and may modulate capacity of scroll compressor 10d/10e with capacity modulation system(s) in step 1716. Controller 302 may then return to step 1702 and receive operating signal(s) again.

In step 1718, controller 302 may determine whether TC is greater than fifty percent. When TC is greater than fifty percent, controller 302 may set the speed of electric motor 12 to low in step 1720 and may modulate compressor capacity with refrigerant injection system in step 1722. Controller 302 may then return to step 1702 and receive operating signal(s) again.

When in step 1718, TC is not greater than fifty percent, controller 302 may set the speed of electric motor 12 to low in step 1724 and may modulate capacity of the scroll compressor 10d/10e with capacity modulation system(s) in step 1726. Controller 302 may then return to step 1702 and receives operating signal(s) again.

In this way, controller 302 may maximize compressor efficiency by modulating compressor capacity with a refrigerant injection system 203, a scroll separation system 32, and/or a delayed suction system 100, to accurately meet TC.

What is claimed is:

1. A method comprising:
    determining a target capacity for a scroll compressor having intermeshing scroll members, a motor, a scroll separation system for separating the intermeshing scroll members, and a delayed suction system for releasing pressure from at least one intermediate chamber created by the intermeshing scroll members;
    comparing the target capacity with a first predetermined capacity range and a second predetermined capacity range, each of the first and second predetermined capacity ranges having an upper capacity range and a lower capacity range;
    operating the motor at a high speed when the target capacity is within the first predetermined capacity range and at a low speed when the target capacity is within the second predetermined capacity range;
    operating the scroll separation system according to a first pulse width modulation cyclic ratio, with the delayed suction system deactivated, when the target capacity is within the upper capacity range of the first predetermined capacity range or the upper capacity range of the second predetermined capacity range, the first pulse width modulation cyclic ratio being calculated based on the target capacity, and the high or low speed; and
    operating the scroll separation system according to a second pulse width modulation cyclic ratio, with the delayed suction system activated, when the target capacity is within the lower capacity range of the first predetermined capacity range or the lower capacity range of the second predetermined capacity range, the second pulse width modulation cyclic ratio being calculated based on the target capacity, and the high or low speed.

2. The method of claim 1 wherein said low speed is half of said high speed.

3. The method of claim 2 wherein said first predetermined capacity range is from fifty percent capacity to one hundred percent capacity and wherein said second predetermined capacity range is from five percent capacity to fifty percent capacity.

4. The method of claim 1 wherein said upper capacity range of said first predetermined capacity range is from sixty seven percent to one hundred percent, said lower capacity range of said first predetermined capacity range is from fifty percent to sixty seven percent, said upper capacity range of said second predetermined capacity range is from thirty three percent to fifty percent, and said lower capacity range of said second predetermined capacity range is from five percent to thirty four percent.

5. A method comprising:
    determining a target capacity for a scroll compressor having intermeshing scroll members, a motor, a scroll separation system for separating the intermeshing scroll members, and a delayed suction system for releasing pressure from at least one intermediate chamber created by the intermeshing scroll members;
    comparing the target capacity with a first predetermined capacity range and a second predetermined capacity range, each of the first and second predetermined capacity ranges having an upper capacity range and a lower capacity range;
    operating the motor at a high speed when the target capacity is within the first predetermined capacity range and at a low speed when the target capacity is within the second predetermined capacity range;
    operating the delayed suction system according to a first pulse width modulation cyclic ratio, with the scroll separation system deactivated, when the target capacity is within the upper capacity range of the first predetermined capacity range or the upper capacity range of the second predetermined capacity range, the first pulse width modulation cyclic ratio being calculated based on the target capacity, and the high or low speed; and
    operating the scroll separation system according to a second pulse width modulation cyclic ratio, with the delayed suction system fully activated, when the target capacity is within the lower capacity range of the first predetermined capacity range or the lower capacity range of the second predetermined capacity range, the second pulse width modulation cyclic ratio being calculated based on the target capacity, and the high or low speed.

6. The method of claim 5 wherein said low speed is half of said high speed and said first predetermined capacity range is from fifty percent capacity to one hundred percent capacity and wherein said second predetermined capacity range is from five percent capacity to fifty percent capacity.

7. The method of claim 6 wherein said upper portion of said first predetermined capacity range is from sixty seven percent to one hundred percent, said lower portion of said first predetermined capacity range is from fifty percent to sixty seven percent, said upper portion of said second predetermined capacity range is from thirty three percent to fifty percent, and said lower portion of said second predetermined capacity range is from five percent to thirty four percent.

8. A system comprising:
    a scroll compressor having intermeshing scroll members, a motor, a scroll separation system for separating the intermeshing scroll members, and a delayed suction system for releasing pressure from at least one intermediate chamber created by the intermeshing scroll members;
    a controller, connected to the motor, the scroll separation system, and the delayed suction system, that determines a target capacity of the scroll compressor;

compares the target capacity with a first predetermined capacity range and a second predetermined capacity range, each of the first and second predetermined capacity ranges having an upper capacity range and a lower capacity range;

operates the motor at a high speed when the target capacity is within the first predetermined capacity range and at a low speed when the target capacity is within the second predetermined capacity range;

operates the delayed suction system according to a first pulse width modulation cyclic ratio, with the scroll separation system deactivated, when the target capacity is within the upper capacity range of the first predetermined capacity range or the upper capacity range of the second predetermined capacity range, the first pulse width modulation cyclic ratio being calculated based the target capacity, and the high or low speed; and operates the scroll separation system according to a second pulse width modulation cyclic ratio, with the delayed suction system fully activated, when the target capacity is within the lower capacity range of the first predetermined capacity range or the lower capacity range of the second predetermined capacity range, the second pulse width modulation cyclic ratio being calculated based on the target capacity, and the high or low speed.

9. The system of claim 8 wherein said low speed is half of said high speed and said first predetermined capacity range is from fifty percent capacity to one hundred percent capacity and wherein said second predetermined capacity range is from five percent capacity to fifty percent capacity.

10. The system of claim 8 wherein said upper portion of said first predetermined capacity range is from sixty seven percent to one hundred percent, said lower portion of said first predetermined capacity range is from fifty percent to sixty seven percent, said upper portion of said second predetermined capacity range is from thirty three percent to fifty percent, and said lower portion of said second predetermined capacity range is from five percent to thirty four percent.

* * * * *

UNITED STATES PATENT AND TRADEMARK OFFICE
CERTIFICATE OF CORRECTION

| | |
|---|---|
| PATENT NO. | : 8,485,789 B2 |
| APPLICATION NO. | : 12/121856 |
| DATED | : July 16, 2013 |
| INVENTOR(S) | : Yumin Gu et al. |

Page 1 of 1

It is certified that error appears in the above-identified patent and that said Letters Patent is hereby corrected as shown below:

Title Page, Column 2,
Other Documents, Line 2       After "PCT/US2008/006397", insert --,--.

Title Page 2, Column 2,
Other Documents, Line 2       After "PCT/US2008/006397", insert --,--.

Title Page 2, Column 2,
Other Documents, Line 26      Delete "Seond" and insert --Second--.

In the Specification

Column 5, Line 20             After "system;", insert --and--.

Column 11, Line 35            Delete "my" and insert --may--.

In the Claims

Column 19, Line 16            In Claim 8, after "based", insert --on--.

Signed and Sealed this
Twenty-fourth Day of September, 2013

Teresa Stanek Rea
*Deputy Director of the United States Patent and Trademark Office*